(12) United States Patent
Nakai

(10) Patent No.: US 8,120,849 B2
(45) Date of Patent: Feb. 21, 2012

(54) METHOD FOR MANUFACTURING RETARDATION FILM, RETARDATION FILM, POLARIZING PLATE, AND LIQUID CRYSTAL DISPLAY

(75) Inventor: Shinichi Nakai, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 377 days.

(21) Appl. No.: 12/360,681

(22) Filed: Jan. 27, 2009

(65) Prior Publication Data

US 2009/0195877 A1 Aug. 6, 2009

(30) Foreign Application Priority Data

Jan. 31, 2008 (JP) ................................. 2008-021608

(51) Int. Cl.
*G02B 27/28* (2006.01)

(52) U.S. Cl. ......... 359/489.01; 359/489.02; 359/489.03; 359/489.07

(58) Field of Classification Search ............. 359/487.01, 359/487.02, 487.06, 489.01–489.03, 489.07; 349/96

See application file for complete search history.

(56) References Cited

U.S. PATENT DOCUMENTS

| | | | |
|---|---|---|---|
| 5,219,510 A | 6/1993 | Machell et al. | |
| 5,288,715 A | 2/1994 | Machell et al. | |
| 7,618,716 B2 * | 11/2009 | Hirono et al. | 428/515 |
| 2002/0098372 A1 * | 7/2002 | Wong et al. | 428/523 |
| 2009/0209705 A1 | 8/2009 | Okaniwa et al. | |

FOREIGN PATENT DOCUMENTS

| | | | |
|---|---|---|---|
| JP | 6-501040 A | | 2/1994 |
| JP | 06-059121 A | | 3/1994 |
| JP | 09-218307 A | | 8/1997 |
| JP | 2001-42130 A | | 2/2001 |
| JP | 2002-267844 A | | 9/2002 |
| JP | 2003232924 A | * | 8/2003 |
| JP | 2004-339408 A | | 12/2004 |
| JP | 2006-124628 A | | 5/2006 |
| JP | 2006-154760 A | | 6/2006 |
| JP | 2006-205472 A | | 8/2006 |
| JP | 2006-215064 A | | 8/2006 |
| WO | WO 2006132431 A1 | * | 12/2006 |

OTHER PUBLICATIONS (Machine_Translation_from_http://aipnl.ipd1.input.go.jp_of_JP_2003-232,924.pdf).*
Notice of Reasons for Rejection, dated Aug. 22, 2011, issued in corresponding JP Application No. 2008-021608, 6 pages in English and Japanese.

* cited by examiner

*Primary Examiner* — Frank Font
(74) *Attorney, Agent, or Firm* — Sughrue Mion, PLLC

(57) ABSTRACT

A retardation film is manufactured by stretching a thermoplastic resin film while adjusting stretching ratio $\alpha$ [%], temperature $\beta$ [° C.], and stretching speed $\gamma$ [%/min] so that the following formulas (1) and (2) are satisfied when the thermoplastic resin film is stretched at the stretching ratio $\alpha$ [%], the temperature $\beta$ [° C.], and the stretching speed $\gamma$ [%/min], therefore, stretching unevenness can be prevented:

$$Z > X \tag{1}$$

$$(X \times 100/k) \times 0.2 < (Y-X) \times 100/k \tag{2}$$

here X represents yield stress [MPa] in a stress-strain curve, Y represents stress [MPa] in the stress-strain curve when the film is further stretched from the yield stress by k [%] which is the amount of strain until the yield stress, and Z represents stress [MPa] in the stress-strain curve when the film is stretched to $\alpha$ [%].

7 Claims, 5 Drawing Sheets

FIG.4A

| EXAMPLE | RESIN | TRANSVERSE DIRECTION STRETCHING RATIO α [%] | TRANSVERSE DIRECTION STRETCHING TEMPERATURE β [°C] | TRANSVERSE DIRECTION STRETCHING SPEED γ [%/min] | AMOUNT OF STRAIN AT YIELD POINT k [%] | YIELD STRESS X [MPa] | K+K STRETCHING STRESS Y [MPa] | α% STRETCHING STRESS Z [MPa] | (X×100 /k) | ((Y−X) ×100/k) |
|---|---|---|---|---|---|---|---|---|---|---|
| 1 | CELLULOSE ACYLATE RESIN | 40 | 176 | 100 | 3.2 | 2.9 | 5.2 | 12.4 | 90.6 | 71.9 |
| 2 |  | 50 | 190 | 100 | 3 | 0.8 | 1.5 | 7.9 | 26.7 | 23.3 |
| 3 |  | 30 | 165 | 100 | 2.8 | 5.1 | 6.2 | 13.8 | 182.1 | 39.3 |
| 4 |  | 40 | 176 | 250 | 3.2 | 4.8 | 6.2 | 13.2 | 150.0 | 43.8 |
| 5 | SATURATED NORBORNENE RESIN | 80 | 145 | 100 | 3.1 | 1.8 | 2.4 | 5 | 58.1 | 19.4 |
| 6 |  | 150 | 160 | 100 | 3.6 | 0.3 | 0.5 | 1.5 | 8.3 | 5.6 |
| COMPARATIVE EXAMPLE 1 | CELLULOSE ACYLATE RESIN | 25 | 150 | 100 | 3.6 | 14.2 | 15.3 | 22.5 | 394.4 | 30.6 |
| 2 |  | 30 | 165 | 250 | 3.3 | 6.4 | 7.4 | 15.1 | 193.9 | 30.3 |
| 3 | SATURATED NORBORNENE RESIN | 65 | 138 | 100 | 3.9 | 10.1 | 7.1 | 7.6 | 259.0 | −76.9 |
| 4 |  | 80 | 145 | 380 | 3.5 | 5.5 | 5.1 | 6.3 | 157.1 | −11.4 |

FIG.4B

| | | Re [nm] | Rth [nm] | Rth/Re [-] | Re unevenness [nm] | Rth unevenness [nm] | Panel overall evaluation |
|---|---|---|---|---|---|---|---|
| | Resin | | | | | | |
| Example 1 | Cellulose acylate resin | 79 | 249 | 3.2 | 2.5 | 3.9 | Good |
| 2 | | 91 | 256 | 2.8 | 2.2 | 3.3 | Good |
| 3 | | 62 | 227 | 3.7 | 8.2 | 15.6 | Good |
| 4 | | 66 | 241 | 3.7 | 6.3 | 11.8 | Good |
| 5 | Saturated norbornene resin | 43 | 138 | 3.2 | 4.9 | 12.2 | Good |
| 6 | | 34 | 116 | 3.4 | 2.8 | 5.5 | Good |
| Comparative Example 1 | Cellulose acylate resin | 53 | 223 | 4.2 | 11 | 23.7 | Poor |
| 2 | | 67 | 226 | 3.4 | 9.2 | 21.7 | Poor |
| 3 | Saturated norbornene resin | 71 | 177 | 2.5 | 12.4 | 26.8 | Poor |
| 4 | | 66 | 169 | 2.6 | 10.2 | 22.2 | Poor |

United States Patent US 8,120,849 B2

METHOD FOR MANUFACTURING RETARDATION FILM, RETARDATION FILM, POLARIZING PLATE, AND LIQUID CRYSTAL DISPLAY

BACKGROUND OF THE INVENTION

1. Field of the Invention

The present invention relates to a method for manufacturing a retardation film, a polarizing plate, and a liquid crystal display, and particularly to a method for manufacturing a retardation film which does not easily cause stretching unevenness and has quality suitable for a liquid crystal display, a retardation film and a polarizing plate, and a liquid crystal display.

2. Description of the Related Art

The manufacture of a thermoplastic resin film is largely divided into a solution film-forming method and a melt film-forming method. The solution film-forming method is a method in which a dope in which a thermoplastic resin is dissolved in a solvent is cast from a die onto a support, for example, a cooling drum, to be in the shape of a film. On the other hand, the melt film-forming method is a method in which a thermoplastic resin is melted in an extruder and then extruded from a die onto a support, for example, a cooling drum, to be in the shape of a film. By performing uniaxial stretching in the machine (longitudinal) direction, or uniaxial stretching in the transverse direction (width direction), or biaxial stretching in the machine and transverse directions for a thermoplastic resin film formed by these methods, in-plane retardation (Re) and thickness direction retardation (Rth) are exhibited. The thermoplastic resin film exhibiting retardation Re and retardation Rth is used as the retardation film of a liquid crystal display element for intending to increase the viewing angle (see, for example, Japanese National Publication of International Patent Application No. 6-501040 and Japanese Patent Application Laid-Open No. 2001-42130).

SUMMARY OF THE INVENTION

However, in stretching the thermoplastic resin film in the machine and/or transverse directions to manufacture a retardation film, not only thickness uniformity is required as in general purpose films so far, but also optical properties, such as Re and Rth, being uniform at high levels is required. Therefore, in forming a retardation film, it is necessary to stretch the thermoplastic resin film in a state, in which stretching unevenness is hard to occur.

The present invention has been made in view of such circumstances, and it is an object of the present invention to provide a method for manufacturing a retardation film with small stretching unevenness by adjusting a stretching ratio, a temperature, and a stretching speed in a stretching process so that a change in a slope of a stress-strain curve is in a predetermined range, the retardation film, a polarizing plate, and a liquid crystal display.

In order to achieve the above object, a method for manufacturing a retardation film according to an aspect of the present invention comprises: feeding a thermoplastic resin film; and stretching the thermoplastic resin film while adjusting stretching ratio α [%], temperature β [° C.], and stretching speed γ [%/min] so that the following formulas (1) and (2) are satisfied when the thermoplastic resin film is stretched at the stretching ratio α [%], the temperature β [° C.], and the stretching speed γ [%/min]:

$$Z > X \quad (1)$$

$$(X \times 100/k) \times 0.2 < (Y-X) \times 100/k \quad (2)$$

here, X represents yield stress [MPa] in a stress-strain curve, Y represents stress [MPa] in the stress-strain curve when the film is further stretched from the yield stress by k [%] which is the amount of strain until the yield stress, and Z represents stress [MPa] in the stress-strain curve when the film is stretched to α [%].

According to the aspect of the present invention, the thermoplastic resin film is stretched under the above conditions in which the slope of the stress-strain curve of the thermoplastic resin film does not change largely before and after the occurrence of yield stress, so that the stretching unevenness of the thermoplastic resin film can be decreased. If the stretching of the thermoplastic resin film does not satisfy the above conditions, in the plane of the thermoplastic resin film, only a region where stretching is started is stretched, and other regions are not stretched. Since in-plane uniform stretching is not performed, stretching unevenness occurs.

According to the aspect of the present invention, as long as the thermoplastic resin film exhibits retardation, stretching includes stretching in the machine direction (MD), and stretching in the transverse direction (TD), and also uniaxial stretching in which stretching is performed only in the machine direction or the transverse direction, and biaxial stretching in which stretching is performed in both the machine direction and the transverse direction. As the stretching method, the methods of stretching by a tenter, and stretching by rollers having different peripheral speeds, and the like can be used.

In the method for manufacturing a retardation film according to the aspect, the in-plane retardation Re may be 20 nm to 100 nm, the thickness direction retardation Rth may be 40 nm to 300 nm, and the ratio of Re and Rth, Rth/Re may be 0.4 to 8.

Since the film is stretched to satisfy the above formulas (1) and (2) in the process of stretching the thermoplastic resin film, a retardation film having properties of an in-plane retardation Re of 20 nm to 100 nm, a thickness direction retardation Rth of 40 nm to 300 nm, and a ratio of Re and Rth, Rth/Re, of 0.4 to 8 can be favorably manufactured.

In the method for manufacturing a retardation film according to the aspect of the present invention, the Re unevenness in the transverse direction is 10 nm or less, and the Rth unevenness in the transverse direction is 20 nm or less.

Since the film is stretched to satisfy the above formulas (1) and (2) in the process of stretching the thermoplastic resin film, a retardation film with small unevenness, in which the Re unevenness in the transverse direction is 10 nm or less, and the Rth unevenness in the transverse direction is 20 nm or less, can be favorably manufactured.

In the method for manufacturing a retardation film according to the aspect of the present invention, the thermoplastic resin is a cellulose acylate resin.

The method according to the aspect of the present invention is particularly effective in manufacturing a cellulose acylate film exhibiting retardation well.

In the method for manufacturing a retardation film according to the aspect of the present invention, the thermoplastic resin is a saturated norbornene-based resin.

The method according to the aspect of the present invention is particularly effective in manufacturing a saturated norbornene film exhibiting retardation well.

A retardation film according to an aspect of the present invention is manufactured by the manufacturing method.

A polarizing plate according to an aspect of the present invention uses the retardation film as a substrate.

A liquid crystal display according to an aspect of the present invention uses the polarizing plate.

The aspects relate to the retardation film manufactured by the manufacturing method, the polarizing plate using this retardation film for a substrate, and the liquid crystal display using this polarizing plate. Since the retardation film according to the aspect of the present invention is hard to cause stretching unevenness, the retardation film can exhibit uniform Re and Rth, and thus can be favorably used for the above applications.

According to the aspects of the present invention, for the process of stretching the thermoplastic resin film, the stretching ratio, the temperature, and the stretching speed are adjusted so that the change in the slope of the stress-strain curve of the thermoplastic resin film is in a predetermined range before and after yield stress in the stress-strain curve, therefore, a retardation film with small stretching unevenness can be manufactured.

BRIEF DESCRIPTION OF THE DRAWINGS

FIGS. 4A and 4B are table diagrams summarizing conditions and film evaluation for examples.

DETAILED DESCRIPTION OF THE PREFERRED EMBODIMENTS

An embodiment of a method for manufacturing a cellulose acylate film according to embodiments of the present invention will be described below. The present invention will be described by way of the following preferred embodiments. However, without departing from the scope of the present invention, changes can be made by many methods, and embodiments other than these embodiments can be used. Therefore, all changes within the scope of the present invention are included in the claims. Also, in the specification, a range of numerical values represented using "to" means a range including numerical values described before and after "to."

A preferred embodiment of the method for manufacturing a cellulose acylate film according to the present invention will be described below with reference to the accompanying drawings. However, the present invention is not limited to this and can also be applied to a saturated norbornene-based resin film.

Figure 1:
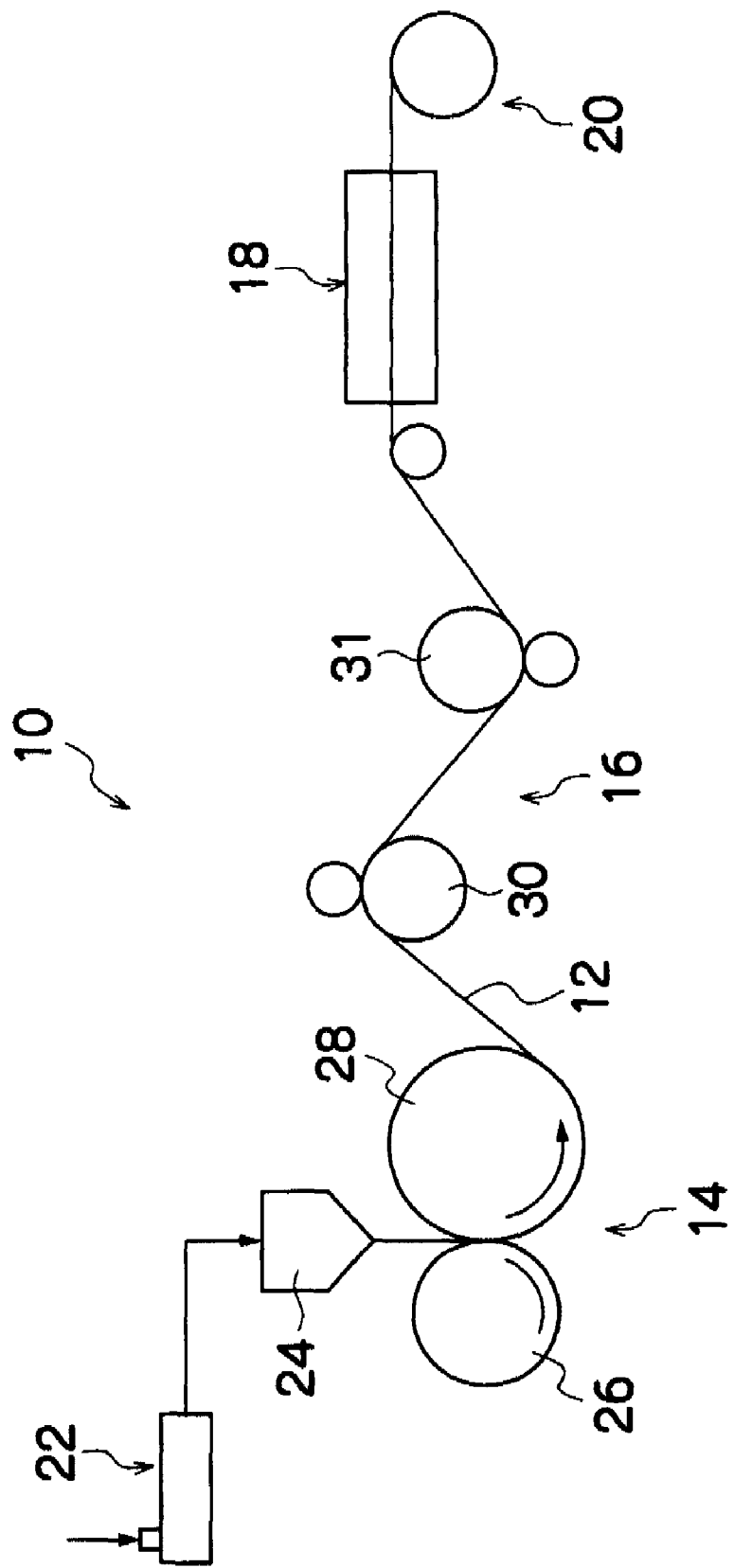
FIG. 1 is a schematic diagram showing the configuration of a film manufacturing apparatus to which the present invention is applied.

FIG. 1 shows one example of the schematic configuration of an apparatus for manufacturing a cellulose acylate film. As shown in FIG. 1, a manufacturing apparatus 10 includes a film forming process unit 14 which manufactures a cellulose acylate film 12 before stretching, a machine direction stretching process unit 16 which stretches the cellulose acylate film 12 manufactured in the film forming process unit 14 in the machine direction, a transverse direction stretching process unit 18 which stretches the cellulose acylate film 12 in the transverse direction, and a winding process unit 20 which winds the stretched cellulose acylate film 12.

In the film forming process unit 14, a cellulose acylate resin melted in an extruder 22 is discharged in the shape of a sheet from a die 24 and fed between a pair of rotating polishing rollers 26 and 28. The cellulose acylate film 12 cooled and solidified on the polishing roller 28 is released from the polishing roller 28, then sent to the machine direction stretching process unit 16 and the transverse direction stretching process unit 18 in order and stretched, and wound in the shape of a roll in the winding process unit 20. Thus, the stretched cellulose acylate film 12 is manufactured. The stretching process may be any of uniaxial stretching in the machine (longitudinal) direction, or uniaxial stretching in the transverse direction, or biaxial stretching in the machine and transverse directions. The detail of each process unit will be described below.

Figure 2:
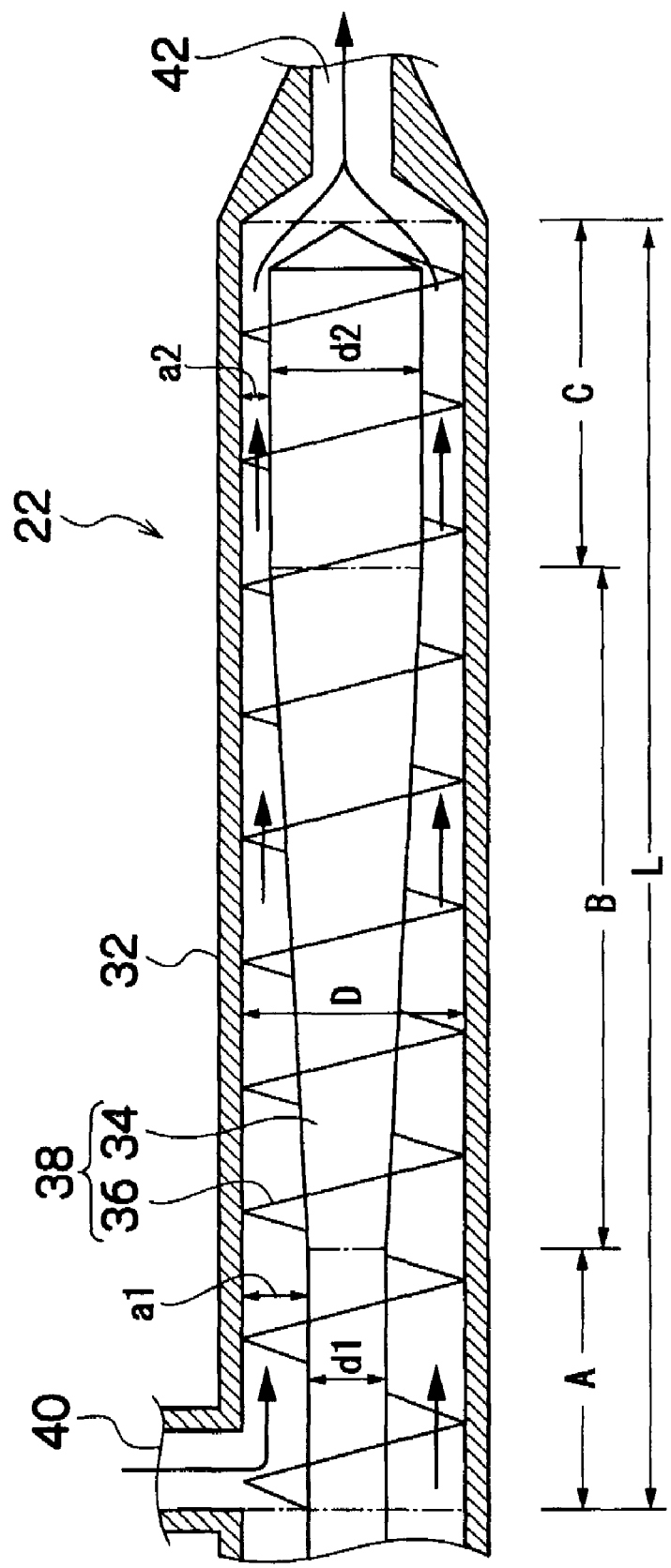
FIG. 2 is a schematic diagram showing the configuration of an extruder.

The single screw extruder 22 in the film forming process unit 14 is shown in FIG. 2. As shown in FIG. 2, a single screw 38 in which flights 36 are attached to a screw shaft 34 is provided in a cylinder 32. The cellulose acylate resin is fed from a hopper, not shown, into the cylinder 32 via a feed port 40. The interior of the cylinder 32 is provided with a feed part which transports a fixed amount of the cellulose acylate resin fed from the feed port 40 (a region shown by A), a compression part which kneads and compresses the cellulose acylate resin (a region shown by B), and a metering part which meters the kneaded and compressed cellulose acylate resin (a region shown by C), in order from the feed port 40 side. The cellulose acylate resin melted in the extruder 22 is continuously sent from a discharge port 42 to the die 24.

The screw compression ratio of the extruder 22 is set to 2.5 to 4.5, and the L/D is set to 20 to 50. The screw compression ratio is represented by the volume ratio of the feed part A to the metering part C, that is, (volume per unit length in the feed part A)÷(volume per unit length in the metering part C), and is calculated using the outer diameter d1 of the screw shaft 34 in the feed part A, the outer diameter d2 of the screw shaft 34 in the metering part C, a groove part diameter a1 in the feed part A, and a groove part diameter a2 in the metering part C. Also, the L/D is the ratio of cylinder length (L) to cylinder inner diameter (D) in FIG. 2. The extrusion temperature is set to 190 to 240° C. When the temperature in the extruder 22 is more than 240° C., a cooler (not shown) should be provided between the extruder 22 and the die 24.

According to the film forming process unit 14 configured as described above, by discharging the melted resin from the die 24, the discharged melted resin forms a liquid pool (bank) on the clearance between the pair of polishing rollers 26 and 28. Then, the melted resin is sandwiched and pressed between the pair of polishing rollers 26 and 28 to be in the shape of a sheet with the thickness uniformly adjusted, and is wound around the polishing roller 28 to be cooled. Subsequently, the resin is released from the surface of the polishing roller 28, and sent to the later-stage machine direction stretching process unit 16 and transverse direction stretching process unit 18.

In the above-described film forming method, the melt film-forming method in which a thermoplastic resin is melted in an extruder and then extruded from a die onto a support, for example, a cooling drum, to be in the shape of a film has been described. However, the solution film-forming method in which a dope in which a thermoplastic resin is dissolved in a solvent is cast from a die onto a support, for example, a cooling drum, to be in the shape of a film can be applied.

A stretching process in which the cellulose acylate film 12 formed in the film forming process unit 14 is stretched to manufacture the stretched cellulose acylate film 12 will be described below.

The stretching of the cellulose acylate film 12 is performed to orient molecules in the cellulose acylate film 12 to exhibit in-plane retardation (Re) and thickness direction retardation (Rth). Here, the retardation Re and the retardation Rth are obtained by the following formulas:

$$Re\ (\text{nm}) = |n(MD) - n(TD)| \times T\ (\text{nm})$$

$$Rth\ (\text{nm}) = |\{(n(MD) + n(TD))/2\} - n(TH)| \times T\ (\text{nm})$$

wherein n (MD), n (TD), and n (TH) represent refractive indices in the machine direction, the transverse direction, and the thickness direction, and T represents thickness expressed in nm.

The inventor paid attention to stress-strain relationship in the process of stretching a thermoplastic resin film to prevent stretching unevenness in the thermoplastic resin film so that the above retardation Re and retardation Rth were uniform. For the measurement of the stress-strain relationship, for example, STROGRAPH VE50 (manufactured by Toyo Seiki Seisaku-Sho, Ltd.) was used. Measurement was performed by the following procedure. (a) An unstretched thermoplastic resin film was cut with a width of 20 mm in the machine direction and a length of 100 mm in the transverse direction. (b) Then, the thermoplastic resin film was stretched at a predetermined stretching temperature and stretching speed, with the distance between chucks being 50 mm, and the stress-strain relationship at the time was measured to obtain a stress-strain curve.

As a result of measuring stress-strain relationship in the process of stretching the thermoplastic resin film, it was found that the stretching unevenness decreases when the following two formulas are satisfied:

$$Z > X \tag{1}$$

$$(X \times 100/k) \times 0.2 < (Y - X) \times 100/k \tag{2}$$

Stretching is performed adjusting the stretching ratio α [%], the temperature β [° C.], and the stretching speed γ [%/min] to satisfy the above two formulas.

X represents yield stress [MPa] on the stress-strain curve when the thermoplastic resin film is stretched. k represents the amount of strain [%] until the yield stress X occurs. Also, Y represents stress [MPa] when the thermoplastic resin film is further stretched from the yield stress occurrence point with the amount of strain k [%]. Z represents stress [MPa] when the thermoplastic resin film is stretched at the stretching ratio α [%]. The temperature β [° C.] represents film temperature during stretching.

Figure 3:
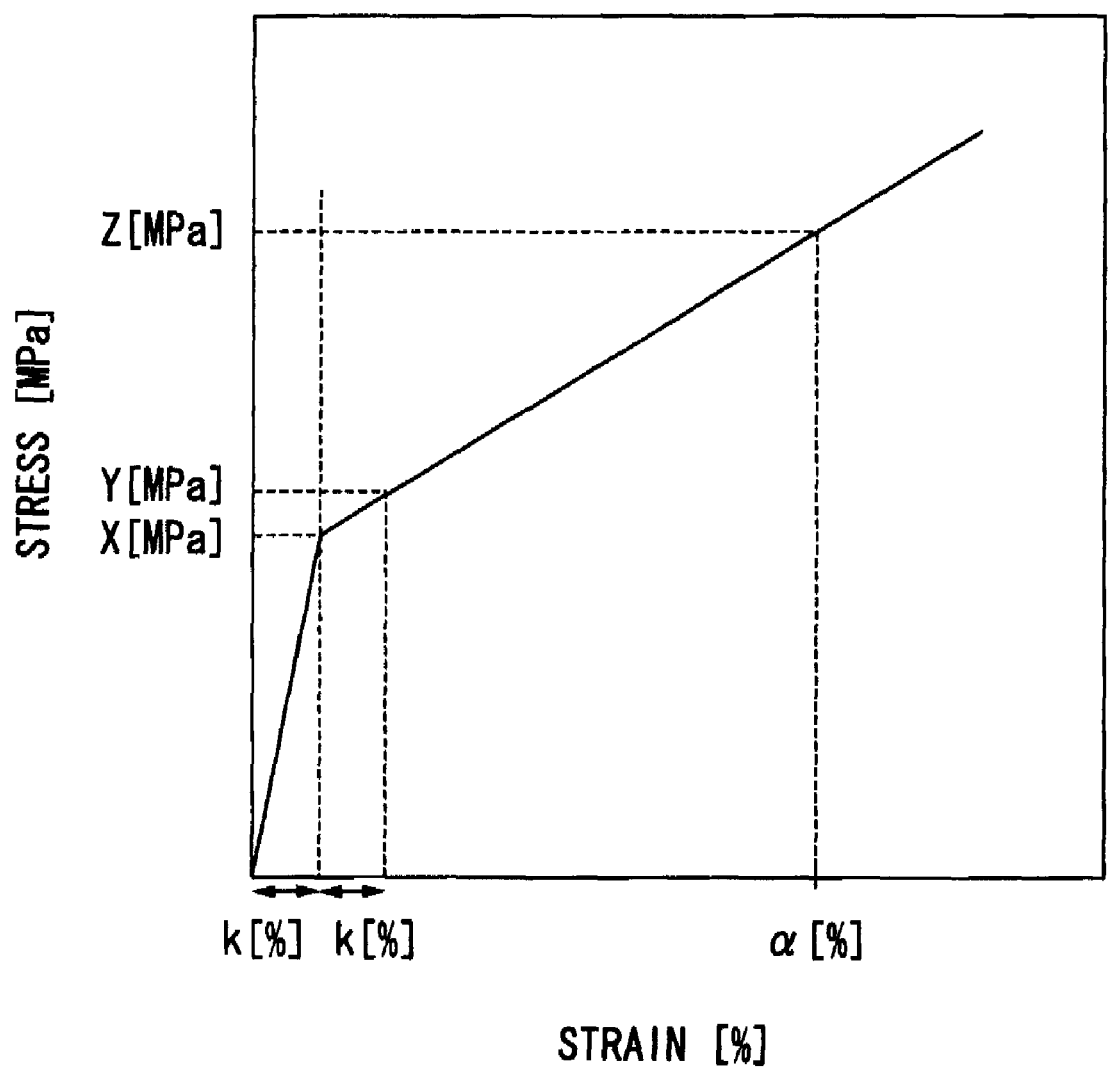
FIG. 3 is a diagram showing a stress-strain curve according to the present invention.

Next, referring to FIG. 3, the stress-strain curve of the thermoplastic resin film according to the present invention will be described. In the graph, the vertical axis represents stress [MPa], and the horizontal axis represents the amount of strain [%]. The points of the above-described X [MPa], Y [MPa], and Z [MPa] are plotted on the stress-strain curve. In the thermoplastic resin film showing the stress-strain curve in FIG. 3, if the formula (1) is not satisfied, that is, if the stress after stretching Z [MPa] is not more than the yield stress X [MPa], stretching unevenness occurs, and Re and Rth unevenness worsens because due to the yield phenomenon, stretching unevenness in which only a part of the film elongates, called necking stretching, occurs, and the necking stretching is eliminated only by stretching the film at stress exceeding the yield stress. From this viewpoint, preferably Z > X × 2.0, more preferably Z > X × 2.5, and further preferably Z > X × 3.0 hold.

Also, if the formula (2) is not satisfied, stretching unevenness occurs, and Re and Rth unevenness worsens. In the formula (2), (X × 100/k) represents the slope of the stress-strain curve until the yield stress. On the other hand, ((Y − X) × 100/k) represents the slope of the stress-strain curve when the film is stretched from the yield stress by a fixed amount. The formula (2) defines that the slope of the stress-strain curve after the yield stress is larger than 20% of the slope of the stress-strain curve until the yield stress because if the slope of the curve is small, the stretching ratio fluctuates due to subtle deviation of stress caused by disturbance and the like, so that stretching unevenness occurs easily. Also, by the formula (2) being a requirement, stretching conditions such that an upper yield point and a lower yield point are clearly shown on the stress-strain curve are eliminated. Here, the yield point means a point at which the slope of the stress-strain curve changes.

From such a viewpoint, preferably (X × 100/k) × 0.3 < (Y − X) × 100/k, more preferably (X × 100/k) × 0.4 < (Y − X) × 100/k, and further preferably (X × 100/k) × 0.5 < (Y − X) × 100/k hold.

For a retardation film in which Re and Rth are exhibited under stretching conditions satisfying the formulas (1) and (2), the measurement of Re and Rth unevenness was performed. For the measurement of Re and Rth unevenness, for example, KOBRA 21ADH (manufactured by Oji Scientific Instruments) was used. For the measurement method, measurement was performed by the following procedure. (a) The film after stretching is cut away at a position 200 mm from an end, including a clipped ear part during tenter stretching. (b) The film is equally cut at 20 points in the transverse direction from both ends, and Re and Rth are measured. (c) The maximum value and minimum value of Re at the time are respectively defined as Remax and Remin, and the maximum value and minimum value of Rth at the time are respectively defined as Rthmax and Rthmin. (d) Re unevenness = Remax − Remin, and Rth unevenness = Rthmax − Rthmin are defined.

The Re and Rth unevenness was measured by the above method. When the Re unevenness was more than 10 nm, and the Rth unevenness was more than 20 nm, light leakage and color unevenness occurred in the display when the film was used for a polarizing plate and the polarizing plate was attached in a liquid crystal display. The Re unevenness is 10 nm or less, and the Rth unevenness is 20 nm or less. Preferably, the Re unevenness is 8 nm or less, and the Rth unevenness is 15 nm or less. More preferably, the Re unevenness is 6 nm or less, and the Rth unevenness is 10 nm or less. Further preferably, the Re unevenness is 4 nm or less, and the Rth unevenness is 6 nm or less.

<<Cellulose Acylate Film>>

[Moisture Permeability]

For the cellulose acylate film of the present invention, preferably, the moisture permeability at 40° C. and a relative humidity of 90% is 100 to 400 g/(m²·day), and the change in moisture permeability after the film is maintained at 60° C. and a relative humidity of 95% for 1000 hours is −100 g/(m²·day) to 10 g/(m²·day). The "moisture permeability" is a change in mass (g/(m²·day)) before and after maintenance when a cup in which calcium chloride is put is covered with a film, and the whole is put in a enclosed container and maintained under conditions of 40° C. and a relative humidity of 90% for 24 hours. The moisture permeability increases with an increase in temperature and also increases with an increase in humidity. However, whatever temperature and humidity are used, the relationship of the magnitude of moisture permeability among films is constant. Therefore, in the present invention, the value of the change in mass at 40° C. and a relative humidity of 90% is used as a reference.

The moisture permeability of the cellulose acylate film of the present invention is preferably 100 to 400 g/(m²·day), more preferably 120 to 350 g/(m²·day), and further preferably 150 to 300 g/(m²·day).

Also, the moisture permeability before and after maintenance when the film is maintained at 60° C. and a relative humidity of 95% for 1000 hours is measured according to the above-described method, and a value obtained by subtracting the moisture permeability before maintenance from the moisture permeability after maintenance is defined as "a change in moisture permeability after the film is maintained at 60° C. and a relative humidity of 95% for 1000 hours." The change in moisture permeability after the cellulose acylate film of the present invention is maintained at 60° C. and a relative humidity of 95% is −100 g/(m²·day) to 10 g/(m²·day), preferably −50 to 5 g/(m²·day), and more preferably −20 to 0 g/(m²·day).

Further, the moisture permeability decreases with an increase in film thickness and increases with a decrease in film thickness, so that a value obtained by first multiplying measured moisture permeability by measured film thickness and then dividing the multiplied value by 80 is defined as "moisture permeability in terms of a film thickness of 80 μm" in the present invention. The moisture permeability in terms of a film thickness of 80 μm for the cellulose acylate film of the present invention is preferably 100 to 420 g/(m²·day), more preferably 150 to 400 g/(m²·day), and further preferably 180 to 350 g/(m²·day).

When the cellulose acylate film satisfying such conditions for moisture permeability is used, a polarizing plate having excellent durability against humidity or heat and humidity, and a liquid crystal display having high reliability can be provided.

[Cellulose Acylate]

In the cellulose acylate film of the present invention, the polymer as a main component is cellulose acylate. Here, when the cellulose acylate film comprises a single polymer, "the polymer as a main component" indicates the polymer, and when the cellulose acylate film comprises a plurality of polymers, "the polymer as a main component" indicates a polymer having the highest mass fraction among the constituent polymers.

As cellulose acylate used in manufacturing the cellulose acylate film of the present invention, powdery and particulate ones can be used, and also, pelleted one can be used. Also, the moisture content of the cellulose acylate is preferably 1.0 mass % or less, further preferably 0.7 mass % or less, and most preferably 0.5 mass % or less. Also, optionally, the moisture content is preferably 0.2 mass % or less. When the moisture content of the cellulose acylate is not in the preferred range, the cellulose acylate is preferably used after drying it by heating or the like. These polymers may be used alone, or two or more of the polymers may be used in combination.

The cellulose acylate includes a cellulose acylate compound, and a compound having an acyl-substituted cellulose skeleton obtained by biologically or chemically introducing a functional group into cellulose as a raw material.

The cellulose acylate is an ester of cellulose and carboxylic acid. As the carboxylic acid constituting the ester, fatty acid having 2 to 22 carbon atoms is further preferred, and lower fatty acid having 2 to 4 carbon atoms is most preferred.

In the cellulose acylate, all or part of the hydrogen atoms of hydroxyl groups present at positions 2, 3, and 6 of a glucose unit constituting cellulose are substituted with an acyl group. Examples of the acyl group include, for example, an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, and a cinnamoyl group. As the acyl group, an acetyl group, a propionyl group, a butyryl group, a dodecanoyl group, an octadecanoyl group, a pivaloyl group, an oleoyl group, a benzoyl group, a naphthyl carbonyl group, and a cinnamoyl group are preferred, and an acetyl group, a propionyl group, and a butyryl group are most preferred.

The cellulose acylate may be substituted with a plurality of acyl groups, specifically including cellulose acetate propionate, cellulose acetate butyrate, cellulose acetate butyrate propionate, cellulose butyrate propionate, and the like.

As the cellulose acylate constituting the cellulose acylate film of the present invention, cellulose acetate having an ester with acetic acid is particularly preferred, and from the viewpoint of solubility in the solvent, cellulose acetate having an acetyl substitution degree of 2.70 to 2.87 is more preferred, and cellulose acetate having an acetyl substitution degree of 2.80 to 2.86 is most preferred. The substitution degree herein indicates the degree that the hydrogen atoms of hydroxyl groups present at positions 2, 3, and 6 of a glucose unit constituting cellulose are substituted, and the substitution degree when the hydrogen atoms of hydroxyl groups present at positions 2, 3, and 6 are substituted is 3.

The basic principle for a method for synthesizing cellulose acylate is described in Nakahiko Migita et al., Wood Chemistry, p. 180 to 190 (KYORITSU SHUPPAN CO., LTD, 1968). A typical method for synthesizing cellulose acylate includes a liquid phase acylation method with carboxylic acid anhydride-carboxylic acid-a sulfuric acid catalyst. Specifically, first, a cellulose raw material, such as cotton linters and wood pulp, is pretreated with a suitable amount of carboxylic acid, such as acetic acid, and then put into an acylation mixed solution, which is previously cooled, for esterification to synthesize complete cellulose acylate (the total of acyl substitution degrees at positions 2, 3, and 6 is about 3.00). The acylation mixed solution generally comprises carboxylic acid as a solvent, carboxylic acid anhydride as an esterifying agent, and sulfuric acid as a catalyst. Also, the carboxylic acid anhydride is usually used in an amount stoichiometrically in excess of the total of cellulose reacting with the carboxylic acid anhydride, and moisture present in the system.

Then, after the completion of the acylation reaction, water or water-containing acetic acid is added to hydrolyze excess carboxylic acid anhydride remaining in the system. Further, an aqueous solution comprising a neutralizing agent (for example, a carbonate, acetate, hydroxide, or oxide of calcium, magnesium, iron, aluminum, or zinc) may be added to neutralize a part of the esterification catalyst. Further, the obtained complete cellulose acylate is kept at 20 to 90° C. in the presence of a small amount of the acylation reaction catalyst (generally, the remaining sulfuric acid) for saponification and thermal formation to be changed to cellulose acylate having the desired acyl substitution degree and polymerization degree. At the point when the desired cellulose acylate is obtained, the catalyst remaining in the system is completely neutralized using the neutralizing agent, or the cellulose acylate solution is put into water or dilute acetic acid (or water or dilute acetic acid is put into the cellulose acylate solution), without neutralizing the catalyst, to separate cellulose acylate, which is subjected to washing and stabilization treatment, thereby, the target cellulose acylate can be obtained.

For the polymerization degree of the cellulose acylate, the viscosity average polymerization degree is preferably 150 to 500, more preferably 200 to 400, and further preferably 220 to 350. The viscosity average polymerization degree can be measured according to description in Uda et al., Limiting Viscosity Method (Kazuo Uda and Hideo Saito, Journal of the Society of Fiber Science and Technology, Japan, Vol. 18, No. 1, p. 105 to 120, 1962). A method for measuring the viscosity average polymerization degree is also described in Japanese Patent Application Laid-Open No. 9-95538.

Also, for cellulose acylate having a small amount of a low molecular component, the average molecular weight (polymerization degree) is high, but the value of viscosity is lower than that of usual cellulose acylate. Such cellulose acylate having a small amount of a low molecular component can be obtained by removing the low molecular component from cellulose acylate synthesized by a usual method. The removal of the low molecular component can be performed by washing cellulose acylate with a suitable organic solvent. Also, the cellulose acylate having a small amount of a low molecular component can be obtained by synthesis. When the cellulose acylate having a small amount of a low molecular component is synthesized, the amount of a sulfuric acid catalyst in acylation reaction is preferably adjusted to 0.5 to 25 parts by mass, based on 100 parts by mass of cellulose. When the amount of the sulfuric acid catalyst is in the range, cellulose acylate also preferred in terms of molecular weight distribution (having a uniform molecular weight distribution) can be synthesized. Raw material cotton and a synthesis method for cellulose ester are also described in JIII Journal of Technical Disclosure (Journal of Technical Disclosure No. 2001-1745, issued on Mar. 15, 2001, Japan Institute of Invention and Innovation), p. 7 to 12.

<<Fabrication of Cellulose Acylate Film>>

The cellulose acylate film of the present invention can be fabricated from a solution containing cellulose acylate and various additives by a solution-casting film-forming method. The solution-casting film-forming method will be described below in detail.

Also, when the melting point of the cellulose acylate of the present invention, or the melting point of a mixture of the cellulose acylate and various additives is lower than the decomposition temperature of these and is higher than stretching temperature, the cellulose acylate film can also be fabricated by film forming by a melt film-forming method. The melt film-forming method is described in Japanese Patent Application Laid-Open No. 2000-352620 and the like.

[Cellulose Acylate Solution]

(Solvent)

When the cellulose acylate film of the present invention is fabricated by the solution-casting film-forming method, a cellulose acylate solution is prepared. As a main solvent for the cellulose acylate solution used at this time, an organic solvent which is a good solvent for the cellulose acylate can be preferably used. As such an organic solvent, an organic solvent having a boiling point of 80° C. or less is more preferred from the viewpoint of a reduction in drying load. The boiling point of the organic solvent is further preferably 10 to 80° C. and particularly preferably 20 to 60° C. Also, optionally, an organic solvent having a boiling point of 30 to 45° C. can also be favorably used as the main solvent.

Such a main solvent includes halogenated hydrocarbon, ester, ketone, ether, alcohol, hydrocarbon, and the like, and these may have a branched structure or a cyclic structure. Also, the main solvent may have any two or more of ester, ketone, ether, and alcohol functional groups (that is, —O—, —CO—, —COO—, and —OH). Further, a hydrogen atom in the hydrocarbon portion of the ester, ketone, ether, and alcohol may be substituted with a halogen atom (particularly, a fluorine atom). When the cellulose acylate solution used for the fabrication of the cellulose acylate film of the present invention comprises a single solvent, the main solvent for the cellulose acylate solution indicates the solvent, and when the cellulose acylate solution comprises a plurality of solvents, the main solvent indicates a solvent having the highest mass fraction among the constituent solvents.

As the halogenated hydrocarbon, chlorinated hydrocarbon is more preferred, including, for example, dichloromethane and chloroform, and dichloromethane is further preferred. The ester includes, for example, methyl formate, ethyl formate, methyl acetate, and ethyl acetate. The ketone includes, for example, acetone and methyl ethyl ketone. The ether includes, for example, diethyl ether, methyl-tert-butyl ether, diisopropyl ether, dimethoxymethane, 1,3-dioxolane, 4-methyldioxolane, tetrahydrofuran, methyltetrahydrofuran, and 1,4-dioxane. The alcohol includes, for example, methanol, ethanol, and 2-propanol. The hydrocarbon includes, for example, n-pentane, cyclohexane, n-hexane, benzene, and toluene.

An organic solvent used in combination with these main solvents includes halogenated hydrocarbon, ester, ketone, ether, alcohol, hydrocarbon, and the like, and these may have a branched structure or a cyclic structure. Also, the organic solvent may have any two or more of ester, ketone, ether, and alcohol functional groups (that is, —O—, —CO—, —COO—, and —OH). Further, a hydrogen atom in the hydrocarbon portion of the ester, ketone, ether, and alcohol may be substituted with a halogen atom (particularly, a fluorine atom).

As the halogenated hydrocarbon, chlorinated hydrocarbon is more preferred, including, for example, dichloromethane and chloroform, and dichloromethane is further preferred. The ester includes, for example, methyl formate, ethyl formate, propyl formate, pentyl formate, methyl acetate, ethyl acetate, and pentyl acetate. The ketone includes, for example, acetone, methyl ethyl ketone, diethyl ketone, diisobutyl ketone, cyclopentanone, cyclohexanone, and methylcyclohexanone. The ether includes, for example, diethyl ether, methyl-tert-butyl ether, diisopropyl ether, dimethoxymethane, dimethoxyethane, 1,4-dioxane, 1,3-dioxolane, 4-methyldioxolane, tetrahydrofuran, methyltetrahydrofuran, anisole, and phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol. The hydrocarbon includes, for example, n-pentane, cyclohexane, n-hexane, benzene, toluene, and xylene. The organic solvent having two or more functional groups includes, for example, 2-ethoxyethyl acetate, 2-methoxyethanol, 2-butoxyethanol, and methyl acetoacetate.

In the cellulose acylate film of the present invention, desirably, preferably 5 to 30 mass %, more preferably 7 to 25 mass %, and further preferably 10 to 20 mass % of alcohol is contained in total solvents from the viewpoint of a reduction in load during release from a band.

Examples of a combination of organic solvents preferably used as solvents for the cellulose acylate solution used for the fabrication of the cellulose acylate film of the present invention are given below, but the combination which can be used in the present invention is not limited to these. The numerical values of ratios mean parts by mass.

(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10

(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolane/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexane=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=85/7/3/5
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolane=100

Also, the detail of the case where a non-halogen-based organic solvent is used as a main solvent is described in JIII Journal of Technical Disclosure (Journal of Technical Disclosure No. 2001-1745, issued on Mar. 15, 2001, Japan Institute of Invention and Innovation) and can be appropriately applied in the present invention.

(Concentration of Solution)

The concentration of the cellulose acylate in the cellulose acylate solution prepared is preferably 5 to 40 mass %, further preferably 10 to 30 mass %, and most preferably 15 to 30 mass %. The concentration of the cellulose acylate can be adjusted to be a predetermined concentration at a stage where the cellulose acylate is dissolved in the solvent. Also, the cellulose acylate solution may be concentrated by previously preparing a low concentration (for example, 4 to 14 mass %) solution and then evaporating the solvent, or the like. Further, the cellulose acylate solution may be diluted after previously preparing a high concentration solution. Also, the concentration of the cellulose acylate can be decreased by adding additives.

(Additives)

The cellulose acylate solution used for the fabrication of the cellulose acylate film of the present invention can comprise various liquid or solid additives according to the application in each preparation process. Examples of the additives include a plasticizer (the preferred amount added is 0.01 to 10 mass % based on the cellulose acylate, the same applies hereinafter), an ultraviolet absorber (0.001 to 1 mass %), a fine particle powder having an average particle size of 5 to 3000 nm (0.001 to 1 mass %), a fluorine-based surfactant (0.001 to 1 mass %), a release agent (0.0001 to 1 mass %), a degradation preventing agent (0.0001 to 1 mass %), an optical anisotropy controlling agent (0.01 to 10 mass %), and an infrared absorber (0.001 to 1 mass %).

The plasticizer and the optical anisotropy controlling agent are organic compounds having a molecular weight of 3000 or less, and preferably compounds having both a hydrophobic portion and a hydrophilic portion. These compounds are oriented between the cellulose acylate chains to change the retardation value. Further, these compounds can improve the hydrophobicity of the film and reduce the change in retardation due to humidity. Also, by using the ultraviolet absorber and the infrared absorber in combination, the wavelength dependence of retardation can be effectively controlled. Any of the additives used for the cellulose acylate film of the present invention is preferably substantially without volatilization in the drying process.

From the viewpoint of intending to reduce the change in retardation due to humidity, the amount of these additives added is preferably larger. However, with an increase in the amount added, the problems of a decrease in the glass transition temperature (Tg) of the cellulose acylate film, and the volatilization of the additives in the film forming process are easily caused. Therefore, when cellulose acetate more preferably used in the present invention is used, the amount of the additives having a molecular weight of 3000 or less is preferably 0.01 to 30 mass % based on the cellulose acylate, more preferably 2 to 30 mass %, and further preferably 5 to 20 mass %.

The plasticizer which can be favorably used for the cellulose acylate film of the present invention is described in Japanese Patent Application Laid-Open No. 2001-151901. Also, the infrared absorber is described in Japanese Patent Application Laid-Open No. 2001-194522. The timing of adding additives can be appropriately determined according to the type of the additives. Also, the additives are described in JIII Journal of Technical Disclosure (Journal of Technical Disclosure No. 2001-1745, issued on Mar. 15, 2001, Japan Institute of Invention and Innovation), p. 16 to 22.

(Preparation of Cellulose Acylate Solution)

The preparation of the cellulose acylate solution can be performed, for example, according to a preparation method described in Japanese Patent Application Laid-Open No. 2005-104148, p. 106 to 120. Specifically, cellulose acylate and a solvent are mixed and stirred for swelling, optionally subjected to cooling, heating, or the like for dissolution, and then, the material is filtered, so that a cellulose acylate solution can be obtained.

<Manufacture of Saturated Norbornene Resin Film>

The process of manufacturing a saturated norbornene resin film according to the present invention will be described below in detail, according to the procedure.

<<Saturated Norbornene Resin>>

Preferred examples of a saturated norbornene resin which is a raw material for the saturated norbornene resin film of the present invention can include a saturated norbornene resin-A and a saturated norbornene resin-B described below. Any of these saturated norbornene resins can be formed into a film by a solution film-forming method and a melt film-forming method described below. However, the saturated norbornene resin-A is more preferably formed into a film by the melt film-forming method, and the saturated norbornene resin-B is more preferably formed into a film by the solution film-forming method. Films using these saturated norbornenes as raw materials have the property of exhibiting moderate Re and Rth by stretching and also have the excellent properties of being hard to cause a fluctuation in Re and Rth even in a high temperature and high humidity environment for a long time and being hard to exhibit fine Re unevenness.

(Saturated Norbornene Resin-A)

The saturated norbornene resin-A can include (1) a resin obtained by performing polymer modification, such as maleic acid addition and cyclopentadiene addition, as required, on a ring-opening (co)polymer of a norbornene-based monomer and then further performing hydrogenation, (2) a resin obtained by addition polymerizing a norbornene-based monomer, (3) a resin obtained by addition copolymerizing a norbornene-based monomer and an olefin-based monomer, such as ethylene and α-olefin, and the like. The polymerization method and the hydrogenation method can be performed by normal methods.

The norbornene-based monomer includes, for example, norbornene and alkyl- and/or alkylidene-substituted products thereof (for example, 5-methyl-2-norbornene, 5-dimethyl-2-norbornene, 5-ethyl-2-norbornene, 5-butyl-2-norbornene, and 5-ethylidene-2-norbornene) and polar group (such as halogen)-substituted products thereof; dicyclopentadiene and 2,3-dihydrodicyclopentadiene; dimethanooctahydronaphthalene and alkyl- and/or alkylidene-substituted products and polar group (such as halogen)-substituted products thereof (for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene); adducts of cyclopentadiene and tetrahydroindene or the like; and cyclopentadiene trimers and tetramers (for example, 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11,11a-dodecahydro-1H-cyclopentaanthracene). These norbornene-based monomers may be used alone, or two or more of the norbornene-based monomers may be used in combination.

(Saturated Norbornene Resin-B)

The saturated norbornene resin-B can include those represented by the following general formulas (1) to (4). Among these, those represented by the following general formula (1) are particularly preferred.

General formula (1)

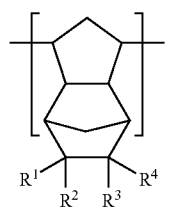

General formula (2)

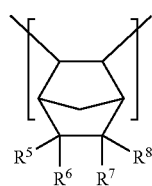

General formula (3)

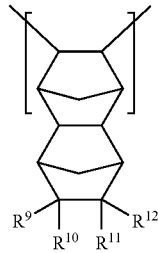

General formula (4)

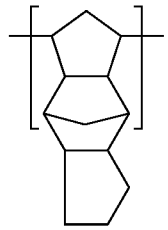

In the general formulas (1) to (4), R1 to R12 each independently represent a hydrogen atom or a monovalent substituent (preferably an organic group), and among these, at least one is preferably a polar group. The mass average molecular weight of these saturated norbornene resins is usually preferably 5,000 to 1,000,000 and more preferably 8,000 to 200,000.

The above substituent includes a halogen atom (for example, a fluorine atom, a chlorine atom, and a bromine atom), an alkyl group (an alkyl group having 1 to 20 and preferably 1 to 10 carbon atoms, including, for example, a methyl group, an ethyl group, an iso-propyl group, a tert-butyl group, an n-octyl group, an n-decyl group, an n-hexadecyl group, a cyclopropyl group, a cyclopentyl group, and a cyclohexyl group), an alkenyl group (an alkenyl group having 1 to 20 and preferably 1 to 10 carbon atoms, including, for example, a vinyl group, an allyl group, a 2-butenyl group, and a 3-pentenyl group), an alkynyl group (an alkynyl group having 1 to 20 and preferably 1 to 10 carbon atoms, including, for example, a propargyl group and a 3-pentynyl group), an aryl group (an aryl group having 6 to 20 and preferably 6 to 15 carbon atoms, including, for example, a phenyl group, a p-methylphenyl group, a naphthyl group, an anthryl group, a phenanthryl group, and a pyrenyl group), an amino group (an amino group having 0 to 20 and preferably 0 to 10 carbon atoms, including, for example, an amino group, a methylamino group, a dimethylamino group, a diethylamino group, and a dibenzylamino group), an alkoxy group (an alkoxy group having 1 to 20 and preferably 1 to 10 carbon atoms, including, for example, a methoxy group, an ethoxy group, and a butoxy group), an aryloxy group (an aryloxy group having 6 to 20 and preferably 6 to 15 carbon atoms, including, for example, a phenyloxy group and a 2-naphthyloxy group), a heterocyclic oxy group (a heterocyclic oxy group having 1 to 20 and preferably 1 to 10 carbon atoms, including, for example, a pyridyloxy group, a pyrimidinyloxy group, a pyridazinyloxy group, and a benzimidazolyloxy group), a silyloxy group (a silyloxy group having 3 to 20 and preferably 3 to 10 carbon atoms, including, for example, a trimethylsilyloxy group and a t-butyldimethylsilyloxy group), an acyl group (an acyl group having 1 to 20 and preferably 1 to 10 carbon atoms, including, for example, an acetyl group, a benzoyl group, a formyl group, and a pivaloyl group), an alkoxycarbonyl group (an alkoxycarbonyl group having 2 to 20 and preferably 2 to 10 carbon atoms, including, for example, a methoxycarbonyl group and an ethoxycarbonyl group), an aryloxycarbonyl group (an aryloxycarbonyl group having 7 to 20 and preferably 7 to 15 carbon atoms, including, for example, a phenyloxycarbonyl group), an acyloxy group (an acyloxy group having 1 to 20 and preferably 1 to 10 carbon atoms, including, for example, an acetoxy group and a benzoyloxy group), an acylamino group (an acylamino group having 1 to 20 and preferably 1 to 10 carbon atoms, including, for example, an acetylamino group and a benzoylamino group), an alkoxycarbonylamino group (an alkoxycarbonylamino group having 2 to 20 and preferably 2 to 10 carbon atoms, including, for example, a methoxycarbonylamino group), an aryloxycarbonylamino group (an aryloxycarbonylamino group having 7 to 20 and preferably 7 to 15 carbon atoms, including, for example, a phenyloxycarbonylamino group), an alkyl- or aryl-sulfonylamino group (an alkyl- or aryl-sulfonylamino group having 1 to 20 and preferably 1 to 10 carbon atoms, including, for example, a methanesulfonylamino group and a benzenesulfonylamino group), a sulfamoyl group (a sulfamoyl group having 0 to 20 and preferably 0 to 10 carbon atoms, including, for example, a sulfamoyl group, an N-methylsulfamoyl group, an N,N-dimethylsulfamoyl group, and an N-phenylsulfamoyl group), a carbamoyl group (a carbamoyl group having 1 to 20 and preferably 1 to 10 carbon atoms, including, for example, a carbamoyl group, an N-methylcarbamoyl group, an N,N-diethylcarbamoyl group, and an N-phenylcarbamoyl group), an alkylthio group (an alkylthio group having 1 to 20 and preferably 1 to 10 carbon atoms, including, for example, a methylthio group and an ethylthio group), an arylthio group (an arylthio group having 6 to 20 and preferably 6 to 15 carbon atoms, including, for example, a phenylthio group), a heterocyclic thio group (a heterocyclic thio group having 1 to 20 and preferably 1 to 10 carbon atoms, including, for example, a pyridinylthio group, a pyrimidinylthio group, a pyridazinylthio group, a benzimidazolylthio group, and a thiadiazolylthio group), an alkyl- or aryl-sulfonyl group (an alkyl- or aryl-sulfonyl group having 1 to 20 and preferably 1 to 10 carbon atoms, including, for example, a mesyl group and a tosyl group), an alkyl- or aryl-sulfinyl group (an alkyl- or aryl-sulfonyl group having 1 to 20 and preferably 1 to 10 carbon atoms, including, for example, a methanesulfinyl group and a benzenesulfinyl group), a hydroxy group, a mercapto group, a cyano group, a sulfo group, a carboxyl group, a nitro group, a hydroxamic acid group, a sulfino group, a hydrazino group, an imino group, a heterocyclic group (a heterocyclic group having 1 to 20 and preferably 1 to 10 carbon atoms, including, for example, a nitrogen atom, an oxygen atom, and a sulfur atom, specifically, for example, an imidazolyl group, a pyridyl group, a quinolyl group, a furil group, a thienyl group, a piperidyl group, a morpholino group, a benzoxazolyl group, a benzimidazolyl group, a benzothiazolyl group, a carbazolyl group, and an azepinyl group), a silyl group (a silyl group having 3 to 20 and preferably 3 to 10 carbon atoms, including, for example, a trimethylsilyl group and a triphenylsilyl group), and the like. The hydrogen atoms of these substituents may be further substituted. Also, when two or more substituents are present in one molecule, the substituents may be the same or different. Also, if possible, the substituents may be linked to each other to form a ring. As the substituent, a halogen atom, an alkyl group, a silyl group, an aryl group, an alkoxy group, and an aryloxy group are preferred, and a methyl group, a trimethylsilyl group, a phenyl group, and a methoxy group are particularly preferred.

The above polar group refers to an organic group in which polarization is caused by an atom having high electronegativity, such as oxygen, sulfur, nitrogen, and halogen. The above polar group specifically includes an amino group (an amino group having 1 to 20 and preferably 1 to 10 carbon atoms, including, for example, an amino group, a methylamino group, a dimethylamino group, a diethylamino group, and a dibenzylamino group), an alkoxy group (an alkoxy group having 1 to 20 and preferably 1 to 10 carbon atoms, including, for example, a methoxy group, an ethoxy group, and a butoxy group), an aryloxy group (an aryloxy group having 6 to 20 and preferably 6 to 15 carbon atoms, including, for example, a phenyloxy group and a 2-naphthyloxy group), a heterocyclic oxy group (a heterocyclic oxy group having 1 to 20 and preferably 1 to 10 carbon atoms, including, for example, a pyridinyloxy group, a pyrimidinyloxy group, a pyridazinyloxy group, and a benzimidazolyloxy group), a silyloxy group (a silyloxy group having 3 to 20 and preferably 3 to 10 carbon atoms, including, for example, a trimethylsilyloxy group and a t-butyldimethylsilyloxy group), an acyl group (an acyl group having 1 to 20 and preferably 1 to 10 carbon atoms, including, for example, an acetyl group, a benzoyl group, a formyl group, and a pivaloyl group), an alkoxycarbonyl group (an alkoxycarbonyl group having 2 to 20 and preferably 2 to 10 carbon atoms, including, for example, a methoxycarbonyl group and an ethoxycarbonyl group), an aryloxycarbonyl group (an aryloxycarbonyl group having 6 to 20 and preferably 6 to 15 carbon atoms, including, for example, a phenyloxycarbonyl group), an acyloxy group (an acyloxy group having 1 to 20 and preferably 1 to 10 carbon atoms, including, for example, an acetoxy group and a benzoyloxy group), an acylamino group (an acylamino group having 1 to 20 and preferably 1 to 10 carbon atoms, including, for example, an acetylamino group and a benzoylamino group), an alkoxycarbonylamino group (an alkoxycarbonylamino group having 2 to 20 and preferably 2 to 10 carbon atoms, including, for example, a methoxycarbonylamino group), an aryloxycarbonylamino group (an aryloxycarbonylamino group having 6 to 20 and preferably 6 to 15 carbon atoms, including, for example, a phenyloxycarbonylamino group), an alkyl- or aryl-sulfonylamino group (an alkyl- or aryl-sulfonylamino group having 1 to 20 and preferably 1 to 10 carbon atoms, including, for example, a methanesulfonylamino group and a benzenesulfonylamino group), a sulfamoyl group (a sulfamoyl group having 0 to 20 and preferably 0 to 10 carbon atoms, including, for example, a sulfamoyl group, an N-methylsulfamoyl group, an N,N-dimethylsulfamoyl group, and an N-phenylsulfamoyl group), a carbamoyl group (a carbamoyl group having 1 to 20 and preferably 1 to 10 carbon atoms, including, for example, a carbamoyl group, an N-methylcarbamoyl group, an N,N-diethylcarbamoyl group, and an N-phenylcarbamoyl group), an ureido group (an ureido group having 1 to 20 and preferably 1 to 10 carbon atoms, including, for example, an ureido group, a methylureido group, and a phenylureido group), a hydroxy group, a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group, and the like. These substituents may be directly linked to a norbornene ring, may be linked via an alkylene group or the like, or may be further substituted. Also, when two or more substituents are present in one molecule, the substituents may be the same or different. Also, if possible, the substituents may be linked to each other to form a ring. The preferred polar groups are an amino group, an alkoxy group, an aryloxy group, a heterocyclic oxy group, a silyloxy group, an acyl group, an alkoxycarbonyl group, an aryloxycarbonyl group, an acyloxy group, an acylamino group, an alkoxycarbonylamino group, and an aryloxycarbonylamino group. An alkoxycarbonyl group, an acyloxy group, an acylamino group, and an alkoxycarbonylamino group are further preferred, and an alkoxycarbonyl group is particularly preferred.

The saturated norbornene resins which can be used in the present invention can include, for example, resins described in Japanese Patent Application Laid-Open No. 60-168708, Japanese Patent Application Laid-Open No. 62-252406, Japanese Patent Application Laid-Open No. 62-252407, Japanese Patent Application Laid-Open No. 2-133413, Japanese Patent Application Laid-Open No. 63-145324, Japanese Patent Application Laid-Open No. 63-264626, Japanese Patent Application Laid-Open No. 1-240517, and Japanese Examined Application Publication No. 57-8815.

Among these resins, a hydrogenated polymer obtained by hydrogenating a ring-opening polymer of a norbornene-based monomer is particularly preferred.

The glass transition temperature (Tg) of these saturated norbornene resins is preferably 120° C. or more, and further preferably 140° C. or more, and the saturated water absorption rate is preferably 1 mass % or less, and further preferably 0.8 mass % or less. The glass transition temperature (Tg) and saturated water absorption rate of the saturated norbornene resins represented by the above general formulas (1) to (4) can be controlled by selecting the type of R1 to R12.

In the present invention, as the saturated norbornene resin, at least one tetracyclododecene derivative represented by the following general formula (5) can be used alone, or a hydrogenated polymer obtained by hydrogenating a polymer obtained by metathesis polymerizing the tetracyclododecene derivative and an unsaturated cyclic compound copolymerizable with the tetracyclododecene derivative can also be used.

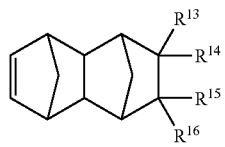

General formula (5)

In the general formula (5), R13 to R16 each independently represent a hydrogen atom or a monovalent substituent (preferably an organic group), and among these, at least one is preferably a polar group. Specific examples and preferred ranges of the substituent and the polar group herein are the same as those described for the general formulas (1) to (4).

By at least one of R13 to R16 being a polar group in the tetracyclododecene derivative represented by the above general formula (5), a polarizing film having excellent adhesiveness to other materials and excellent heat resistance can be obtained. Further, this polar group is preferably a group represented by —(CH2)nCOOR, wherein, R represents a hydrocarbon group having 1 to 20 carbon atoms, and n represents an integer of 0 to 10, because the finally obtained hydrogenated polymer (the substrate of a polarizing film) has high glass transition temperature. Particularly, preferably, one polar substituent represented by —(CH2)nCOOR is contained per molecule of the tetracyclododecene derivative of the general formula (5) in terms of decreasing the water absorption rate. In the above polar substituent, a larger number of carbon atoms of the hydrocarbon group represented by R is preferred in that the moisture absorption properties of the obtained hydrogenated polymer is lower. However, in terms of balance with the glass transition temperature of the obtained hydrogenated polymer, the hydrocarbon group is preferably a chain alkyl group having 1 to 4 carbon atoms, or a (poly)cyclic alkyl group having 5 or more carbon atoms, and particularly preferably a methyl group, an ethyl group, or a cyclohexyl group.

Further, a tetracyclododecene derivative of the general formula (5) in which a hydrocarbon group having 1 to 10 carbon atoms is bonded as a substituent to a carbon atom to which a group represented by —(CH2)nCOOR is bonded is preferred because the moisture absorption properties of the obtained hydrogenated polymer is low. Particularly, a tetracyclododecene derivative of the general formula (5) in which this substituent is a methyl group or an ethyl group is preferred in that its synthesis is easy. Specifically, 8-methyl-8-methoxycarbonyltetracyclo[4,4,0,12.5,17.10]dodeca-3-ene is preferred. Mixtures of these tetracyclododecene derivatives and unsaturated cyclic compounds copolymerizable with the tetracyclododecene derivatives can be metathesis polymerized and hydrogenated by, for example, a method described in Japanese Patent Application Laid-Open No. 4-77520, p. 4, upper right column, l. 12 to p. 6, lower right column, l. 6.

The intrinsic viscosity (ηinh) of these norbornene resins measured in chloroform at 30° C. is preferably 0.1 to 1.5 dl/g and further preferably 0.4 to 1.2 dl/g. Also, the value of the hydrogenation rate of the hydrogenated polymer measured at 60 MHz and 1H-NMR is preferably 50% or more, more preferably 90% or more, and further preferably 98% or more. As the hydrogenation rate increases, the obtained saturated norbornene resin film has more excellent stability to heat and light. The content of gel included in the hydrogenated polymer is preferably 5 mass % or less and further preferably 1 mass % or less.

(Other Ring-Opening Polymerizable Cycloolefins)

In the present invention, other ring-opening polymerizable cycloolefins can be combined within the range not impairing the object of the present invention. As specific examples of such a cycloolefin, compounds having one reactive double bond, for example, cyclopenten, cyclooctene, and 5,6-dihydrodicyclopentadiene, are illustrated. The content of these ring-opening polymerizable cycloolefins is preferably 0 mole % to 50 mole % based on the above norbornene-based monomer, more preferably 0.1 mole % to 30 mole %, and particularly preferably 0.3 mole % to 10 mole %.

<<Additives>>

(1) Fine Particles

Fine particles are preferably contained in the saturated norbornene resin film. Particularly, fine particles are preferably added as a matting agent. The fine particles used in the present invention can include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. Also, fine particles of a crosslinked polymer, and the like can also be used.

These fine particles usually form secondary particles having an average particle size of 0.1 to 3.0 μm, and these fine particles are present as aggregates of primary particles in the film and form 0.1 to 3.0 μm irregularities on the film surface. The secondary average particle size is preferably 0.2 μm to 1.5 μm, further preferably 0.4 μm to 1.2 μm, and most preferably 0.6 μm to 1.1 μm. For the primary and secondary particle sizes, particles in the film are observed by a scanning electron microscope, and the diameter of a circle circumscribing a particle is defined as a particle size. Also, 200 particles in different places are observed, and their average value is defined as an average particle size.

The preferred amount of the fine particles is preferably 1 ppm to 10000 ppm in weight ratio, based on the saturated norbornene resin, more preferably 5 ppm to 7000 ppm, and further preferably 10 ppm to 5000 ppm.

Fine particles of a substance comprising silicon are preferred because the turbidity can be lowered, and particularly, silicon dioxide is preferably used. Fine particles of silicon dioxide preferably have a primary average particle size of 20 nm or less and an apparent specific gravity of 70 g/liter or more. Those having a primary particle average diameter as small as 5 to 16 nm are more preferred because the haze of the film can be lowered. The apparent specific gravity is preferably 90 to 200 g/liter or more, and further preferably 100 to 200 g/liter or more. Higher apparent specific gravity is preferred because a higher concentration dispersion can be made, and the haze and the aggregates improve.

As the fine particles of silicon dioxide, commercial products, for example, AEROSIL R972, R972V, R974, R812, 200, 200V, 300, R202, OX50, and TT600 (manufactured by NIPPON AEROSIL CO., LTD.), can be used. Fine particles of zirconium oxide are commercially available, for example, under the trade names AEROSIL R976 and R811 (manufactured by NIPPON AEROSIL CO., LTD.) and can be used.

Among these, AEROSIL 200V and AEROSIL R972V are particularly preferred because they are fine particles of silicon dioxide having a primary average particle size of 20 nm or less and an apparent specific gravity of 70 g/liter or more and have a large effect of lowering the friction coefficient while keeping the turbidity of the optical film low.

(2) Antioxidant

The saturated norbornene resin of the present invention can be stabilized by adding a publicly known antioxidant, for example, 2,6-di-t-butyl-4-methyl phenol, 2,2'-dioxy-3,3'-di-t-butyl-5,5'-dimethylphenylmethane, tetrakis[methylene-3-(3,5-di-t-butyl-4-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzil) benzene, stearyl-β-(3,5-di-t-butyl-4-hydroxyphenyl) propionate, 2,2'-dioxy-3,3'-di-t-butyl-5,5'-diethylphenylmethane, 3,9-bis[1,1-dimethyl-2-[β-(3-t-butyl-4-hydroxy-5-methylphenyl)propionyloxy]ethyl], 2,4,8,10-tetraoxyspiro[5,5]undecane, tris(2,4-di-t-butylphenyl) phosphite, cyclic neopentanetetraylbis(2,4-di-t-butylphenyl) phosphite, cyclic neopentanetetraylbis(2,6-di-t-butyl-4-methylphenyl)phosphite, 2,2-methylenebis(4,6-di-t-butylphenyl)octyl phosphite; an ultraviolet absorber, for example, 2,4-dihydroxybenzophenone, and 2-hydroxy-4-methoxybenzophenone; and the like. Also, an additive, such as a lubricant, can also be added for the purpose of improving the processability. The amount of these antioxidants added is usually 0.1 to 3 parts by mass, based on 100 parts by mass of the saturated norbornene resin, and preferably 0.2 to 2 parts by mass.

(3) Other Additives

Various additives, such as an age resister, such as a phenol-based age resister and a phosphorus-based age resister, an antistatic agent, an ultraviolet absorber, and the above-described lubricant, may be further added, as desired, to the saturated norbornene resin. Particularly, liquid crystal is usually degraded by ultraviolet rays, so that when other protection measures, such as laminating an ultraviolet protection filter, are not taken, an ultraviolet absorber is preferably added. As the ultraviolet absorber, a benzophenone-based ultraviolet absorber, a benzotriazol-based ultraviolet absorber, an acrylnitrile-based ultraviolet absorber, and the like can be used, and among them, a benzophenone-based ultraviolet absorber is preferred. The amount added is usually 10 to 100,000 mass ppm based on the saturated norbornene resin, and preferably 100 to 10,000 mass ppm. Also, when a sheet is fabricated by a solution casting method, a leveling agent is preferably added to decrease the surface roughness. As the leveling agent, leveling agents for paint, for example, a fluorine-based nonionic surfactant, a special acrylic resin-based leveling agent, and a silicone-based leveling agent, can be used, and among them, those having good compatibility with the solvent are preferred. The amount added is usually 5 to 50,000 mass ppm based on the saturated norbornene resin, and preferably 10 to 20,000 mass ppm.

The above cellulose acylate and additives are preferably mixed and pelletized prior to melt film-forming.

In pelletization, the cellulose acylate and the additives are preferably previously dried, and also, instead of this, a vent type extruder can be used. When drying is performed, as the drying method, a method for heating in a heating furnace at 90° C. for 8 hours or more, or the like can be used, but the drying method is not limited to this. Pelletization can be performed by melting the above cellulose acylate and additives at 150° C. or more and 250° C. or less using a twin screw kneading extruder, then, extruding the material in the shape of noodles, solidifying the extruded material in water, and cutting it. Also, pelletization may be performed by an underwater cutting method in which after melting by an extruder, the material is cut while being directly extruded into water from a mouthpiece, or the like.

For the extruder, any of a publicly known single screw extruder, non-intermeshing counterrotating twin screw extruder, intermeshing counterrotating twin screw extruder, intermeshing corotating twin screw extruder, and the like can be used, as long as sufficient melt kneading is achieved.

For the preferred size of the pellet, preferably, the cross-sectional area is 1 $mm^2$ or more and 300 $mm^2$ or less, and the length is 1 mm or more and 30 mm or less. More preferably, the cross-sectional area is 2 $mm^2$ or more and 100 $mm^2$ or less, and the length is 1.5 mm or more and 10 mm or less.

Also, when pelletization is performed, the above additives can be introduced from a raw material introduction port and a vent port in the extruder.

The number of revolutions of the extruder is preferably 10 rpm or more and 1000 rpm or less, more preferably 20 rpm or more and 700 rpm or less, and further preferably 30 rpm or more and 500 rpm or less. If the rotation speed is slower than this, the residence time is long, so that due to thermal degradation, the molecular weight decreases, and the yellowness worsens easily, therefore, such rotation speed is not preferred. Also, if the rotation speed is too fast, problems occur easily, for example, due to shear, molecule cutting occurs easily, a decrease in molecular weight is caused, and the occurrence of crosslinked gel increases.

The extrusion residence time in pelletization is 10 seconds or more and 30 minutes or less, more preferably 15 seconds or more and 10 minutes or less, and further preferably 30 seconds or more and 3 minutes or less. As long as sufficient melting can be achieved, shorter residence time is preferred in that resin degradation and the appearance of yellowness can be suppressed.

(Melt Film-Forming)

(i) Drying

One pelleted by the above-described method is preferably used, and preferably, the moisture in the pellets is decreased prior to melt film-forming.

In the present invention, in order to adjust the moisture content of the cellulose acylate to a preferred amount, the cellulose acylate is preferably dried. For the drying method, drying is often performed using a dehumidified air dryer. But, the drying method is not particularly limited as long as the target moisture content is obtained. (Preferably, drying is efficiently performed by using measures, such as heating, air blowing, reduced pressure, and stirring, alone or in combination, and further preferably, the drying hopper has a heat insulating structure.) The drying temperature is preferably 0 to 200° C., further preferably 40 to 180° C., and particularly preferably 60 to 150° C. If the drying temperature is too low, not only drying takes time, but also the moisture content is not the target value or less, therefore, such drying temperature is not preferred. On the other hand, if the drying temperature is too high, the resin sticks to cause blocking, therefore, such drying temperature is not preferred. The amount of drying air is preferably 20 to 400 m$^3$/hour, further preferably 50 to 300 m$^3$/hour, and particularly preferably 100 to 250 m$^3$/hour. If the amount of drying air is small, the drying efficiency is poor, therefore, such amount of drying air is not preferred. On the other hand, even if the amount of air is large, at a fixed amount or more, a further improvement in drying effect is small, therefore, such amount of air is not economical. The dew point of air is preferably 0 to −60° C., further preferably −10 to −50° C., and particularly preferably −20 to −40° C. For the drying time, at least 15 minutes or more is necessary, and the drying time is further preferably 1 hour or more, and particularly preferably 2 hours or more. On the other hand, even if drying is performed more than 50 hours, the effect of further reducing the moisture rate is small, and fear of the thermal degradation of the resin occurs, so that it is not preferred to unnecessarily prolong the drying time. The moisture content of the cellulose acylate of the present invention is preferably 1.0 mass % or less, further preferably 0.1 mass % or less, and particularly preferably 0.01 mass % or less.

(ii) Melt Extrusion

The above-described cellulose acylate resin is fed into a cylinder via the feed port of an extruder (different from the above extruder for pelletization). The interior of the cylinder is constituted by a feed part which transports a fixed amount of the cellulose acylate resin fed from the feed port (a region A), a compression part which melt kneads and compresses the cellulose acylate resin (a region B), and a metering part which meters the melt kneaded and compressed cellulose acylate resin (a region C), in order from the feed port side. The resin is preferably dried by the above-described method to reduce the amount of moisture, and the drying is more preferably performed in an inert (nitrogen or the like) gas flow in the extruder, or using a vented extruder and evacuating the extruder, to prevent the oxidation of the melted resin by the remaining oxygen. The screw compression ratio of the extruder is set to 2 to 5, and the L/D is set to 20 to 50. Here, the screw compression ratio is represented by the volume ratio of the feed part A to the metering part C, that is, (volume per unit length in the feed part A)÷(volume per unit length in the metering part C), and is calculated using the outer diameter d1 of the screw shaft in the feed part A, the outer diameter d2 of the screw shaft in the metering part C, a groove part diameter a1 in the feed part A, and a groove part diameter a2 in the metering part C. Also, the L/D is the ratio of cylinder length to cylinder inner diameter.

If the screw compression ratio is less than 2 and is too small, the resin is not sufficiently melt kneaded, so that an unmelted portion is produced, and shear heat generation is too small, so that the melting of crystals is insufficient, therefore, fine crystals remain easily in the cellulose acylate film after manufacture, and further, bubbles are easily mixed. Thus, the strength of the cellulose acylate film decreases, or when the film is stretched, the remaining crystals inhibit the stretchability, so that orientation cannot be sufficiently enhanced. On the contrary, if the screw compression ratio is more than 5 and is too large, too much shear stress is applied, so that due to heat generation, the resin is easily degraded, therefore, yellowness appears easily in the cellulose acylate film after manufacture. Also, if too much shear stress is applied, molecule cutting occurs, and the molecular weight decreases, so that the mechanical strength of the film decreases. Therefore, in order that yellowness does not appear easily in the cellulose acylate film after manufacture, that the film strength is strong, and that the film does not break easily during stretching, the screw compression ratio should be in the range of 2 to 5 and is more preferably in the range of 2.5 to 4.5 and particularly preferably 3.0 to 4.0.

Also, if the L/D is less than 20 and is too small, melting is insufficient, and kneading is insufficient, so that fine crystals remain easily in the cellulose acylate film after manufacture as in the case where the compression ratio is small. On the contrary, if the L/D is more than 50 and is too large, the residence time of the cellulose acylate resin in the extruder is too long, easily causing resin degradation. Also, if the residence time is long, molecule cutting occurs, and the molecular weight decreases, so that the mechanical strength of the cellulose acylate film decreases. Therefore, in order that yellowness does not appear easily in the cellulose acylate film after manufacture, that the film strength is strong, and that the film does not break easily during stretching, the L/D is preferably in the range of 20 to 50, more preferably in the range of 25 to 45, and particularly preferably in the range of 30 to 40.

Also, the extrusion temperature is preferably in the above-described temperature range. The thus obtained cellulose acylate film has characteristic values, a haze of 2.0% or less and a yellow index (YI value) of 10 or less.

Here, the haze is an indicator for whether the extrusion temperature is too low, in other words, an indicator for knowing whether the amount of the crystals remaining in the cellulose acylate film after manufacture is large or small. If the haze is more than 2.0%, a decrease in the strength of the cellulose acylate film after manufacture, and break during stretching occur easily. Also, the yellow index (YI value) is an indicator for knowing whether the extrusion temperature is too high, and when the yellow index (YI value) is 10 or less, there is no problem in terms of yellowness.

For the type of the extruder, generally, a single screw extruder with relatively low equipment cost is often used, and there are screw types, such as full flight, Maddock, and Dulmage. The full flight type is preferred for the cellulose acylate resin having relatively poor heat stability.

The preferred diameter of the screw differs according to the target extrusion amount per unit time and is 10 mm or more and 300 mm or less, more preferably 20 mm or more and 250 mm or less, and further preferably 30 mm or more and 150 mm or less.

(iii) Filtration

It is preferred to perform the so-called breaker plate type filtration in which a filter medium is provided at the exit of the extruder for the filtration of foreign substances in the resin and for avoiding the damage of the gear pump caused by foreign substances. Also, it is preferred to provide a filtration apparatus, in which the so-called leaf disc filter is incorporated, after the gear pump to filter foreign substances with higher precision. Filtration can be performed with a filtration part provided in one place, and also, multistage filtration in which filtration is performed with filtration parts provided in a plurality of places may be performed. The filtration precision of the filter medium is preferably higher, and the filtration precision is preferably 15 μm to 3 μm and further preferably 10 μm to 3 μm in terms of the pressure resistance of the filter medium and an increase in filtration pressure due to the clogging of the filter medium. Particularly, when a leaf disc filter apparatus which finally filters foreign substances is used, a filter medium having high filtration precision in quality is preferably used, and the number of the filter mediums can be adjusted to ensure suitable pressure resistance and filter life. For the type of the filter medium, in terms of use at high temperature and high pressure, iron steel materials are preferably used. Among the iron steel materials, particularly, stainless steel, steel, and the like are preferably used, and in terms of corrosion, particularly, stainless steel is desirably used. For the configuration of the filter medium, in addition to a filter medium obtained by knitting wire, a sintered filter medium obtained by sintering and forming, for example, long metal fibers or a metal powder can be used. In terms of filtration precision and filter life, a sintered filter medium is preferred.

(iv) Gear Pump

In order to improve the thickness precision, it is important to decrease the fluctuation in discharge amount, and it is effective to provide a gear pump between the extruder and the die to feed a fixed amount of the cellulose acylate resin from the gear pump. A gear pump is such that a pair of gears comprising a drive gear and a driven gear are housed with the gears meshing with each other, and by driving the drive gear so that both gears mesh and rotate, the resin in a melted state is sucked into a cavity from a suction port formed in a housing, and a fixed amount of the resin is discharged from a discharge port also formed in the housing. Even if there is some fluctuation in the pressure of the resin in the tip portion of the extruder, the fluctuation is absorbed by using the gear pump, so that the fluctuation in the pressure of the resin downstream of the film forming apparatus is very small, and the fluctuation in thickness is improved. The range of the fluctuation in the pressure of the resin in the die portion can be within ±1% by using the gear pump.

In order to improve the fixed amount feeding performance of the gear pump, a method in which the number of revolutions of the screw is changed to control pressure before the gear pump to be constant can also be used. Also, a high precision gear pump using three or more gears which eliminates the fluctuation of the gears of a gear pump is effective.

For other merits of using the gear pump, a reduction in energy consumption, the prevention of an increase in the temperature of the resin, an improvement in transport efficiency, a reduction in residence time in the extruder, and a reduction in the L/D of the extruder can be expected because film forming can be performed with the pressure in the tip portion of the screw lowered. Also, when a filter is used for the removal of foreign substances, without the gear pump, the amount of the resin fed from the screw may fluctuate with an increase in filtration pressure, but this can be solved by using the gear pump in combination. On the other hand, the demerits of the gear pump are that depending on the method for selecting equipment, the length of the equipment is long, so that the residence time of the resin is long, and that the shear stress in the gear pump part may cause molecule chain cutting, and therefore, caution is necessary.

The preferred residence time of the resin from when the resin enters the extruder from the feed port to when the resin exits from the die is 2 minutes or more and 60 minutes or less, more preferably 3 minutes or more and 40 minutes or less, and further preferably 4 minutes or more and 30 minutes or less.

By the flow of a polymer for circulation in the bearing of the gear pump worsening, sealing by the polymer in the drive part and the bearing part worsens, so that the problem that the fluctuation in metering and fed liquid extrusion pressure is large occurs, therefore, the design (particularly, clearance) of the gear pump suited to the melt viscosity of the cellulose acylate resin is necessary. Also, optionally, the residence portion of the gear pump is a cause of the degradation of the cellulose acylate resin, so that a structure with residence as little as possible is preferred. Also for a polymer pipe or an adapter which connects the extruder and the gear pump or the gear pump and the die or the like, design with residence as little as possible is necessary, and for the stabilization of the extrusion pressure of the cellulose acylate resin whose melt viscosity is highly temperature dependent, the fluctuation in temperature is preferably as small as possible. Generally, a band heater with inexpensive equipment cost is often used for heating the polymer pipe, and an aluminum cast heater with a smaller fluctuation in temperature is more preferably used. Further, in order to stabilize the discharge pressure of the extruder as described above, preferably, the barrel of the extruder is heated by 3 or more and 20 or less heaters divided, for melting.

(v) Die

The cellulose acylate resin is melted by the extruder configured as described above, and the melted resin is continuously fed to the die via the filer and the gear pump as required. The die may be of any type of a generally used T-die, fishtail die, and hanger coat die, as long as the die has design with little residence of the melted resin in the die. Also, a static mixer for increasing the uniformity of the resin temperature being incorporated immediately before the T-die is not a problem. The clearance of the exit portion of the T-die should be generally 1.0 to 5.0 times the film thickness, and the clearance is preferably 1.2 to 3 times, and further preferably 1.3 to 2 times. If the lip clearance is less than 1.0 times the film thickness, it is difficult to obtain a sheet having a good surface state by film forming. Also, if the lip clearance is more than 5.0 times larger than the film thickness, the thickness precision of the sheet decreases, therefore, such lip clearance is not preferred. The die is very important equipment which determines the film thickness precision, and one which can severely control thickness adjustment is preferred. Usually, the thickness can be adjusted at intervals of 40 to 50 mm, and a type in which the film thickness can be adjusted at intervals of preferably 35 mm or less and further preferably 25 mm or less is preferred. Also, since the melt viscosity of the cellulose acylate resin is highly temperature dependent and shear rate dependent, design with the temperature unevenness, and flow rate unevenness in the transverse direction in the die as small as possible is important. Also, an automatic thickness adjustment die which measures downstream film thickness, calculates thickness deviation, and feeds back the result for the thickness adjustment of the die is effective for a reduction in thickness fluctuation in long-term continuous production.

For the manufacture of a film, a single-layer film forming apparatus with low equipment cost is generally used, and optionally, the manufacture of a film which has a functional layer provided as an outer layer and has two or more structures, using a multilayer film forming apparatus, is also possible. Generally, preferably, a thin functional layer is laminated on a surface layer, but the layer ratio is not particularly limited.

(vi) Casting

The melted resin extruded on a sheet by the die by the above method is cooled and solidified on a cooling drum to obtain a film. At this time, preferably, the adhesion of the cooling drum and the melt extruded sheet is increased using a method, such as a static electricity application method, an air knife method, an air chamber method, a vacuum nozzle method, and a touch roll method. Such adhesion improvement methods may be performed on the entire surface of the melt extruded sheet or may be performed on a part of the sheet. Particularly, a method for adhering only both ends of the film, called edge pinning, is also often used, but the adhesion improvement method is not limited to this.

For the cooling drum, a method for slow cooling using a plurality of cooling drums is more preferred, and particularly, generally, three cooling drums are relatively frequently used, but this is not limiting. The diameter of the cooling drum is preferably 100 mm or more and 1000 mm or less, and more preferably 150 mm or more and 1000 mm or less. The spacing between the surfaces of the plurality of cooling drums is preferably 1 mm or more and 50 mm or less, and more preferably 1 mm or more and 30 mm or less.

The cooling drum is preferably at 60° C. or more and 160° C. or less, more preferably at 70° C. or more and 150° C. or less, and further preferably at 80° C. or more and 140° C. or less. Subsequently, the film is peeled off from the cooling drum, passed over a take-off roller (nip roll), and then wound. The winding speed is preferably 10 m/minute or more and 100 m/minute or less, more preferably 15 m/minute or more and 80 m/minute or less, and further preferably 20 m/minute or more and 70 m/minute or less.

Preferably, the film forming width is 0.7 m or more and 5 m or less, further preferably 1 m or more and 4 m or less, and further preferably 1.3 m or more and 3 m or less. The thickness of the thus obtained unstretched film is preferably 30 μm or more and 400 μm or less, more preferably 40 μm or more and 300 μm or less, and further preferably 50 μm or more and 200 μm or less.

Also, when the so-called touch roll method is used, the surface of the touch roll may be of resin, such as rubber and Teflon (registered trademark), and the touch roll may be a metal roll. Further, it is also possible to use a roll as is called a flexible roll in which by reducing the thickness of a metal roll, the roll surface is slightly recessed by pressure when the roll touches, and the pressure contact area increases.

The temperature of the touch roll is preferably 60° C. or more and 160° C. or less, more preferably 70° C. or more and 150° C. or less, and further preferably 80° C. or more and 140° C. or less.

(vii) Winding

Preferably, both ends of the thus obtained sheet are trimmed, and the sheet is wound. The trimmed off portions may be reused as the same type of raw material for a film or as a different type of raw material for a film, after being subjected to grinding treatment, or after being subjected to granulation treatment, and treatment such as depolymerization and repolymerization, as required. For the trimming cutter, any type, such as a rotary cutter, a shear blade, and a knife, may be used. Also for the material, any material, such as carbon steel and stainless steel, may be used. Generally, the use of a superhard blade and a ceramic blade is preferred because the life of the cutting tool is long, and also, the generation of chippings is suppressed.

Also, preferably, a laminate film is attached to at least one surface of the film before winding from the viewpoint of flaw prevention. The preferred winding tension is 1 kg/m width or more and 50 kg/width or less, more preferably 2 kg/m width or more and 40 kg/width or less, and further preferably 3 kg/m width or more and 20 kg/width or less. If the winding tension is less than 1 kg/m width, it is difficult to uniformly wind the film. On the contrary, if the winding tension is more than 50 kg/width, the film is tightly wound, so that not only the winding appearance worsens, but also the knot portion of the film extends due to a creep phenomenon, which is a cause of film waving, or residual birefringence due to the elongation of the film occurs. Therefore, such winding tension is not preferred. Preferably, winding is performed while winding tension is detected and controlled to be fixed winding tension by a tension control in the line. When there is a difference in film temperature, depending on the location of the film-forming line, the length of the film may be slightly different due to heat expansion, therefore, it is necessary to adjust the draw ratio of the nip rolls so that tension higher than the defined tension is not applied to the film in the line.

The film can also be wound at fixed tension by the control of winding tension by the tension control, but more preferably, taper is provided according to the diameter of the wound film to provide proper winding tension. Generally, the tension is gradually decreased as the winding diameter increases. Optionally, it may be preferred to increase the tension as the winding diameter increases.

(viii) Properties of Unstretched Cellulose Acylate Film

The thus obtained unstretched cellulose acylate film preferably has Re=0 to 20 nm and Rth=0 to 80 nm, more preferably Re=0 to 15 nm and Rth=0 to 70 nm, and further preferably Re=0 to 10 nm and Rth=0 to 60 nm. Re and Rth respectively represent in-plane retardation and thickness direction retardation. Re is measured by allowing light to enter the film in the direction normal to the film by KOBRA 21 ADH (manufactured by Oji Scientific Instruments). Rth is calculated based on retardation values measured in three directions in total, that is, the above-described Re, and retardations measured by allowing light to enter the film in the directions inclined by +40° and −40° with respect to the direction normal to the film, with the in-plane slow axis as the inclination axis (rotation axis). Also, preferably, an angle θ formed by the film-forming direction (longitudinal direction) and the slow axis of the Re of the film is closer to 0°, +90°, or −90°.

The total light transmittance is preferably 90% to 100%, more preferably 91 to 99%, and further preferably 92 to 98%. The haze is preferably 0 to 1%, more preferably 0 to 0.8%, and further preferably 0 to 0.6%.

The thickness unevenness in both the longitudinal direction and the transverse direction is preferably 0% or more and 4% or less, more preferably 0% or more and 3% or less, and further preferably 0% or more and 2% or less.

The tensile modulus is preferably 1.5 kN/mm$^2$ or more and 3.5 kN/mm$^2$ or less, more preferably 1.7 kN/mm$^2$ or more and 2.8 kN/mm$^2$ or less, and further preferably 1.8 kN/mm$^2$ or more and 2.6 kN/mm$^2$ or less.

The elongation at break is preferably 3% or more and 100% or less, more preferably 5% or more and 80% or less, and further preferably 8% or more and 50% or less.

The Tg (referring to the Tg of the film, that is, the Tg of a mixture of cellulose acylate and additives) is preferably 95° C. or more and 145° C. or less, more preferably 100° C. or more and 140° C. or less, and further preferably 105° C. or more and 135° C. or less.

The thermal dimensional change at 80° C. for one day in both the machine direction and the transverse direction is preferably 0% or more and ±1% or less, more preferably 0% or more and ±0.5% or less, and further preferably 0% or more and ±0.3% or less.

The water permeability at 40° C. and 90% rh is preferably 300 g/m$^2$·day or more and 1000 g/m$^2$·day or less, more preferably 400 g/m$^2$·day or more and 900 g/m$^2$·day or less, and further preferably 500 g/m$^2$·day or more and 800 g/m$^2$·day or less.

The equilibrium moisture content at 25° C. and 80% rh is preferably 1 wt % or more and 4 wt % or less, more preferably 1.2 wt % or more and 3 wt % or less, and further preferably 1.5 wt % or more and 2.5 wt % or less.

(Stretching)

The film formed by the above method is stretched in the machine and/or transverse directions to manufacture a retardation film exhibiting Re and Rth.

In the present invention, in order to prevent stretching unevenness and exhibit uniform retardation, stretching is performed to satisfy the following conditions:

$$Z > X \quad (1)$$

$$(X \times 100/k) \times 0.2 < (Y \times X) \times 100/k \quad (2).$$

Stretching is performed adjusting the stretching ratio α [%], the temperature β [° C.], and the stretching speed γ [%/min] to satisfy the above two formulas.

X represents yield stress [MPa] on the stress-strain curve when the thermoplastic resin film is stretched. k represents the amount of strain [%] until the yield stress X occurs. Also, Y represents stress [MPa] when the thermoplastic resin film is further stretched from the yield stress occurrence point with the amount of strain k [%]. Z represents stress [MPa] when the thermoplastic resin film is stretched at the stretching ratio α [%].

Stretching may be performed equally in the machine direction (MD) and the transverse direction (TD), and stretching may be performed unequally with one stretching ratio larger than the other. Further, relaxation treatment may be performed in combination with stretching in the machine direction (MD) and the transverse direction (TD). These can be performed, for example, in the following combinations:

1 transverse direction stretching
2 transverse direction stretching→relaxation treatment
3 machine direction stretching→transverse direction stretching
4 machine direction stretching→transverse direction stretching→relaxation treatment
5 machine direction stretching→relaxation treatment→transverse direction stretching→relaxation treatment
6 transverse direction stretching→machine direction stretching→relaxation treatment
7 transverse direction stretching→relaxation treatment→machine direction stretching→relaxation treatment
8 machine direction stretching→transverse direction stretching→machine direction stretching
9 machine direction stretching→transverse direction stretching→machine direction stretching→relaxation treatment
10 machine direction stretching
11 machine direction stretching→relaxation treatment.

For the stretching, single-stage stretching may be performed, or multi-stage stretching may be performed. The stretching ratio herein is obtained using the following formula:

stretching ratio (%)=100×{(length after stretching)−(length before stretching)}/(length before stretching).

For such stretching, the film may be stretched in the longitudinal direction, using two or more pairs of nip rolls with high peripheral speed on the exit side (machine direction stretching), and both ends of the film may be grasped by chucks, and the film may be widened in the orthogonal direction (the direction orthogonal to the longitudinal direction) (transverse direction stretching). Also, simultaneous biaxial stretching methods described in Japanese Patent Application Laid-Open No. 2000-37772, Japanese Patent Application Laid-Open No. 2001-113591, and Japanese Patent Application Laid-Open No. 2002-103445 may be used.

Freely controlling the ratio of Re and Rth can also be achieved by controlling a value obtained by dividing the distance between the nip rolls by the film width (an aspect ratio) in the case of machine direction stretching. In other words, by decreasing the aspect ratio, the Rth/Re ratio can be increased. Also, Re and Rth can be controlled by combining machine direction stretching and transverse direction stretching. In other words, by decreasing the difference between the machine direction stretching ratio and the transverse direction stretching ratio, Re can be decreased, and by increasing this difference, Re can be increased.

The Re and Rth of the thus stretched cellulose acylate film preferably satisfy the following formulas:

$$100 \geq Re \geq 20 \text{ nm}, 300 \geq Rth \geq 40 \text{ nm, and } 8 \geq Rth/Re \geq 0.4.$$

Also, preferably, an angle θ formed by the film-forming direction (longitudinal direction) and the slow axis of the Re of the film is closer to 0°, +90°, or −90°. In other words, for machine direction stretching, the angle θ is preferably closer to 0° and is preferably 0±3°, more preferably 0±2°, and further preferably 0±1°. For transverse direction stretching, the angle θ is preferably 90±3° or −90±3°, more preferably 90±2° or −90±2°, and further preferably 90±1° or −90±1°.

The thickness of the cellulose acylate film after stretching is preferably 15 μm or more and 200 μm or less, more preferably 30 μm or more and 170 μm or less, and further preferably 40 μm or more and 140 μm or less. The thickness unevenness in both the longitudinal direction and the transverse direction is preferably 0% or more and 3% or less, more preferably 0% or more and 2% or less, and further preferably 0% or more and 1% or less.

The properties of the stretched cellulose acylate film are preferably in the following ranges. The tensile modulus is preferably 1.5 kN/mm² or more and less than 3.0 kN/mm², more preferably 1.7 kN/mm² or more and 2.8 kN/mm² or less, and further preferably 1.8 kN/mm² or more and 2.6 kN/mm² or less. The elongation at break is preferably 3% or more and 100% or less, more preferably 5% or more and 80% or less, and further preferably 8% or more and 50% or less.

[Surface Treatment]

By appropriately performing surface treatment on the cellulose acylate film of the present invention, the adhesion of the cellulose acylate film and each functional layer (for example, an undercoat layer, a back layer, and an optical anisotropic layer) can be improved. The surface treatment includes glow discharge treatment, ultraviolet ray irradiation treatment, corona treatment, flame treatment, and saponification treatment (acid saponification treatment and alkaline saponification treatment), and particularly, glow discharge treatment and alkaline saponification treatment are preferred. The "glow discharge treatment" herein is treatment in which plasma treatment is performed on the film surface in the presence of a plasma excited gas. The detail of these surface treatment methods is described in JIII Journal of Technical Disclosure (Journal of Technical Disclosure No. 2001-1745, issued on Mar. 15, 2001, Japan Institute of Invention and Innovation) and can be appropriately used.

In order to improve the adhesiveness of the film surface and the functional layer, an undercoat layer (adhesive layer) can also be provided on the cellulose acylate film of the present invention, in addition to the surface treatment, or instead of the surface treatment. The undercoat is described in JIII Journal of Technical Disclosure (Journal of Technical Disclosure No. 2001-1745, issued on Mar. 15, 2001, Japan Institute of Invention and Innovation), p. 32, and these can be appropriately used. Also, the functional layer provided on the cellulose acylate film of the present invention is described in JIII Journal of Technical Disclosure (Journal of Technical Disclosure No. 2001-1745, issued on Mar. 15, 2001, Japan Institute of Invention and Innovation), p. 32 to p. 45, and those described therein can be appropriately used.

<<Optical Compensation Film>>

The cellulose acylate film of the present invention can also be used as an optical compensation film. The "optical compensation film" means an optical material which is generally used for a display, such as a liquid crystal display, and has optical anisotropy, and is synonymous with a retardation film, a retardation plate, an optical compensation plate, an optical compensation sheet, and the like. In a liquid crystal display, the optical compensation film is used for the purpose of improving the contrast of the display screen and improving the viewing angle properties and the color.

The cellulose acylate film of the present invention can also be used as an optical compensation film as it is. Also, a plurality of the cellulose acylate films of the present invention can be laminated, or the cellulose acylate film of the present invention and a film outside the present invention can be laminated to appropriately adjust Re and Rth for use as an optical compensation film. The lamination of the films can be performed using a tackiness agent and an adhesive.

Also, optionally, using the cellulose acylate film of the present invention as the support of an optical compensation film, an optical anisotropic layer of liquid crystal or the like can be provided on the cellulose acylate film for use as the optical compensation film. The optical anisotropic layer applied to the optical compensation film of the present invention may be formed of, for example, a composition containing a liquid crystalline compound or a cellulose acylate film having birefringence.

As the liquid crystalline compound, a discotic liquid crystalline compound or a rod-shaped liquid crystalline compound is preferred.

[Discotic Liquid Crystalline Compound]

Examples of the discotic liquid crystalline compound which can be used as the liquid crystalline compound in the present invention include compounds described in various literatures (for example, C. Destradeetal., Mol. Crysr. Liq. Cryst., Vol. 71, page 111(1981); ed. The Chemical Society of Japan, Kikan Kagaku Sosetsu (Survey of Chemistry, Quarterly), No. 22, Chemistry of Liquid Crystal, Chapter 5, Chapter 10, Section 2 (1994); B. Kohne et al., Angew. Chem. Soc. Chem. Comm., page 1794 (1985); J. Zhang et al., J. Am. Chetn. Soc., Vol. 116, page 2655 (1994)).

In the optical anisotropic layer, discotic liquid crystalline molecules are preferably fixed in an oriented state and are most preferably fixed by polymerization reaction. Also, the polymerization of the discotic liquid crystalline molecules is described in Japanese Patent Application Laid-Open No. 8-27284. In order to fix the discotic liquid crystalline molecules by polymerization, a polymerizable group should be bonded to the disc-shaped core of the discotic liquid crystalline molecule as a substituent. However, if the polymerizable group is directly bonded to the disc-shaped core, it is difficult to keep the oriented state in polymerization reaction. Then, a linking group is introduced between the disc-shaped core and the polymerizable group. A discotic liquid crystalline molecule having a polymerizable group is disclosed in Japanese Patent Application Laid-Open No. 2001-4387.

[Rod-Shaped Liquid Crystalline Compound]

Examples of the rod-shaped liquid crystalline compound which can be used as the liquid crystalline compound in the present invention include azomethenes, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles. Also, as the rod-shaped liquid crystalline compound, not only the low molecular liquid crystalline compounds as described above, but also high molecular liquid crystalline compounds can be used.

In the optical anisotropic layer, rod-shaped liquid crystalline molecules are preferably fixed in an oriented state and are most preferably fixed by polymerization reaction. Examples of a polymerizable rod-shaped liquid crystalline compound which can be used in the present invention include compounds described in, for example, Makrotnol. Chem., Vol. 190, p. 2255 (1989), Advanced Materials Vol., 5, p. 107 (1993), U.S. Pat. Nos. 4,683,327, 5,622,648, 5,770,107, WO 95/22586, WO 95/24455, WO 97/00600, WO 98/23580, WO 98/52905, Japanese Patent Application Laid-Open No. 1-272551, Japanese Patent Application Laid-Open No. 6-16616, Japanese Patent Application Laid-Open No. 7-110469, Japanese Patent Application Laid-Open No. 11-80081, and Japanese Patent Application Laid-Open No. 2001-328973.

(Optical Anisotropic Layer Comprising Polymer Film)

The optical anisotropic layer may be formed of a polymer film. The polymer film can be formed of a polymer which can exhibit optical anisotropy. Examples of the polymer which can exhibit optical anisotropy include polyolefin (for example, polyethylene, polypropylene, and a norbornene-based polymer), polycarbonate, polyallylate, polysulfone, polyvinyl alcohol, polymethacrylic acid ester, polyacrylic acid ester, and cellulose ester (for example, cellulose triacetate and cellulose diacetate). Also, as the polymer, copolymers or polymer mixtures of these polymers may be used.

<<Polarizing Plate>>

The cellulose acylate film or optical compensation film of the present invention can be used as the protective film of a polarizing plate (the polarizing plate of the present invention). The polarizing plate of the present invention comprises two polarizing plate protective films (cellulose acylate films) which protect a polarizing film and both surfaces of the polarizing film, and the cellulose acylate film or optical compensation film of the present invention can be used as at least one polarizing plate protective film. Also, the cellulose acylate film of the present invention can be bonded to the polarizing film roll-to-roll, using an adhesive.

When the cellulose acylate film of the present invention is used as the polarizing plate protective film, the cellulose acylate film of the present invention is preferably subjected to the surface treatment (also described in Japanese Patent Application Laid-Open No. 6-94915 and Japanese Patent Application Laid-Open No. 6-118232) to be hydrophilized, and is preferably subjected to, for example, glow discharge treatment, corona discharge treatment, or alkaline saponification treatment. Particularly, as the surface treatment, alkaline saponification treatment is most preferably used.

Also, as the polarizing film, for example, a polarizing film obtained by immersing a polyvinyl alcohol film in an iodine solution and stretching the film, and the like can be used. When the polarizing film obtained by immersing a polyvinyl alcohol film in an iodine solution and stretching the film is used, the surface-treated surface of the cellulose acylate film of the present invention can be directly bonded to both surfaces of the polarizing film, using an adhesive. In the manufacturing method of the present invention, the cellulose acylate film is preferably directly bonded to the polarizing film in this manner. As the adhesive, an aqueous solution of polyvinyl alcohol or polyvinyl acetal (for example, polyvinyl butyral), and a latex of a vinyl-based polymer (for example, polybutyl acrylate) can be used. A particularly preferred adhesive is an aqueous solution of completely saponified polyvinyl alcohol.

Generally, in a liquid crystal display, a liquid crystal cell is provided between two polarizing plates, so that the liquid crystal display has four polarizing plate protective films. The cellulose acylate film of the present invention can be favorably used for any of the four polarizing plate protective films. Among them, the cellulose acylate film of the present invention is particularly preferably used as an outer protective film which is not located between the polarizing film and the liquid crystal layer (liquid crystal cell) in the liquid crystal display. In this case, a transparent hard coat layer, an antiglare layer, an antireflective layer, and the like can be provided.

<<Liquid Crystal Display>>

The cellulose acylate film, optical compensation film, and polarizing plate of the present invention can be used for liquid crystal displays on various display modes. The cellulose acylate film and optical compensation film of the present invention have low moisture permeability, and this moisture permeability does not increase even if the films are exposed to heat and humidity. Therefore, in a polarizing plate using these, a decrease in polarization degree can be suppressed for a long period. Therefore, a liquid crystal display having high reliability can be provided.

Each liquid crystal mode in which these films are used will be described below. These liquid crystal displays may be any of a transmissive type, a reflective type, and a transflective type.

(TN Type Liquid Crystal Display)

The cellulose acylate film of the present invention can be used as the support of the optical compensation film of a TN (Twisted Nematic) type liquid crystal display having a TN mode liquid crystal cell. The TN mode liquid crystal cell and the TN type liquid crystal display are well known for a long time. The optical compensation film used for the TN type liquid crystal display is described in, in addition to each publication of Japanese Patent Application Laid-Open No. 3-9325, Japanese Patent Application Laid-Open No. 6-148429, Japanese Patent Application Laid-Open No. 8-50206, and Japanese Patent Application Laid-Open No. 9-26572, articles by Mori et al. (Jpn. J. Appl. Phys., Vol. 36 (1997), p. 143, and Jpn. J. Appl. Phys., Vol. 36 (1997), p. 1068).

(STN Type Liquid Crystal Display)

The cellulose acylate film of the present invention may be used as the support of the optical compensation film of an STN (Super Twisted Nematic) type liquid crystal display having an STN mode liquid crystal cell. Generally, in the STN type liquid crystal display, the rod-shaped liquid crystalline molecules in the liquid crystal cell are twisted in the range of 90 to 360 degrees, and the product ($\Delta$nd) of the refractive index anisotropy of the rod-shaped liquid crystalline molecule ($\Delta$n) and the cell gap (d) is in the range of 300 to 1500 nm. The optical compensation film used for the STN type liquid crystal display is described in Japanese Patent Application Laid-Open No. 2000-105316.

(VA Type Liquid Crystal Display)

The cellulose acylate film of the present invention can be used as the optical compensation film of a VA (Vertical Alignment) type liquid crystal display having a VA mode liquid crystal cell and the support of the optical compensation film. The VA type liquid crystal display may be, for example, a multi-domain alignment type as described in Japanese Patent Application Laid-Open No. 10-123576.

(IPS Type Liquid Crystal Display and ECB Type Liquid Crystal Display)

The cellulose acylate film of the present invention is particularly advantageously used as the optical compensation films of an IPS (In Plane Switching) type liquid crystal display and an ECB (Electrically Controlled Birefringence) type liquid crystal display having an IPS mode and ECB mode liquid crystal cell and the support of the optical compensation film, or the protective film of the polarizing plate. These modes are modes in which the liquid crystal material is oriented generally parallel during black presentation, and the liquid crystal molecules are oriented parallel to the substrate surface, while no voltage is applied, for black presentation.

(OCB Type Liquid Crystal Display and HAN Type Liquid Crystal Display)

The cellulose acylate film of the present invention is also advantageously used as the support of the optical compensation film of an OCB (Optically Compensated Bend) type liquid crystal display having an OCB mode liquid crystal cell or an HAN (Hybrid Aligned Nematic) type liquid crystal display having an HAN mode liquid crystal cell. In the optical compensation film used for the OCB type liquid crystal display or the HAN type liquid crystal display, preferably, the direction in which the absolute value of retardation is minimum is not present in the plane nor normal direction of the optical compensation film. The optical properties of the optical compensation film used for the OCB type liquid crystal display or the HAN type liquid crystal display are also determined by the optical properties of the optical anisotropic layer, the optical properties of the support, and the arrangement of the optical anisotropic layer and the support. The optical compensation film used for the OCB type liquid crystal display or the HAN type liquid crystal display is described in Japanese Patent Application Laid-Open No. 9-197397 and is also described in an article by Mori et al. (Jpn. J. Appl. Phys., Vol. 38 (1999), p. 2837).

(Reflective Liquid Crystal Display)

The cellulose acylate film of the present invention is also advantageously used as the optical compensation films of TN type, STN type, HAN type, and GH (Guest-Host) type reflective liquid crystal displays.

These display modes are well known for a long time. The TN type reflective liquid crystal display is described in Japanese Patent Application Laid-Open No. 10-123478, WO 98/48320, and Japanese Patent No. 3022477. The optical compensation film used for the reflective liquid crystal display is described in WO 00/65384.

(Other Liquid Crystal Displays)

The cellulose acylate film of the present invention is also advantageously used as the support of the optical compensation film of an ASM (Axially Symmetric Aligned Microcell) type liquid crystal display having an ASM mode liquid crystal cell. The ASM mode liquid crystal cell has the feature that the thickness of the cell is maintained by a resin spacer whose position is adjustable. Other properties are similar to those of the TN mode liquid crystal cell. The ASM mode liquid crystal cell and the ASM type liquid crystal display are described in an article by Kume et al. (SID98 Digest 1089 (1998)).

<<Hard Coat Film, Antiglare Film, and Antireflective Film>>

The cellulose acylate film of the present invention may be optionally applied to a hard coat film, an antiglare film, and an antireflective film. For the purpose of improving the visibility of a flat panel display, such as an LCD (Liquid Crystal Display), a PDP (Plasma Display Panel), a CRT (Cathode Ray Tube), and an EL (Electro Luminescence), any or all of the hard coat layer, the antiglare layer, and the antireflective layer can be provided to one surface or both surfaces of the cellulose acylate film of the present invention. The desirable embodiments of such an antiglare film and an antireflective film are described in detail in JIII Journal of Technical Disclosure (Journal of Technical Disclosure No. 2001-1745, issued on Mar. 15, 2001, Japan Institute of Invention and Innovation), p. 54 to p. 57, and can also be preferably used in the cellulose acylate film of the present invention.

EXAMPLES

As an unstretched thermoplastic resin film, a cellulose acylate resin film and a saturated norbornene resin film were used. These unstretched thermoplastic resin films were stretched in the transverse direction to obtain film products.

The tables in FIGS. 4A and 4B are lists summarizing transverse direction stretching conditions (transverse direction stretching ratio α [%], transverse direction stretching temperature β [° C.], and transverse direction stretching speed γ [%/min]), stress in each point (yield stress X and after α% stretching Z), Re, Rth, unevenness of Re (Re unevenness), unevenness of Rth (Rth unevenness), and panel mounting evaluation, and the like for the Examples (1 to 6) of the present invention and Comparative Examples (1 to 4). A film having an Re unevenness of 10 nm or less and an Rth unevenness of 20 nm or less is defined as good, and a film having an Re unevenness of more than 10 nm or an Rth unevenness of more than 20 nm is defined as poor.

In Examples 1 to 4 and Comparative Examples 1 and 2, the cellulose acylate resin was used as the thermoplastic resin. Transverse direction stretching was performed under the transverse direction stretching conditions shown in FIGS. 4A and 4B. Examples 1 to 4, and Comparative Examples 1 and 2 satisfied the formula (1): (X<Z). On the other hand, Comparative Examples 1 and 2 did not satisfy the formula (2): (X×100/k)×0.2<(Y−X)×100/k. As a result, the Re unevenness and Rth unevenness of Examples 1 to 4 were smaller than those of Comparative Examples 1 and 2. Also in the panel mounting evaluation, Examples 1 to 4 were good, while Comparative Examples 1 and 2 were poor.

In Examples 5 and 6, and Comparative Examples 3 and 4, the saturated norbornene resin was used as the thermoplastic resin. Transverse direction stretching was performed under the transverse direction stretching conditions shown in FIGS. 4A and 4B. Examples 5 and 6 satisfied the formula (1). On the other hand, Comparative Example 3 did not satisfy the formula (1). Also, Comparative Examples 3 and 4 did not satisfy the formula (2). As a result, the Re unevenness and Rth unevenness of Examples 5 and 6 were smaller than those of Comparative Examples 3 and 4. Also in the panel mounting evaluation, Examples 5 and 6 were good, while Comparative Examples 3 and 4 were poor.

While the examples have been described with transverse direction stretching as an example, similar results are also obtained in machine direction stretching.

As described above, the retardation films stretched to satisfy the formula (1) and the formula (2) show good results in Re unevenness, Rth unevenness, and panel mounting evaluation. As a result, the stretching unevenness in the retardation films decreases, so that the retardation films can be favorably used as an optical film for a liquid crystal display and the like.

What is claimed is:

1. A retardation film manufactured by the manufacturing method comprising
   feeding a thermoplastic resin film; and
   stretching the thermoplastic resin film while adjusting stretching ratio α [%], temperature β [° C.], and stretching speed γ [%/min] so that the following formulas (1) and (2) are satisfied when the thermoplastic resin film is stretched at the stretching ratio α[%], the temperature β [° C.], and the stretching speed γ [%/min]:

$$Z > X \quad (1)$$

$$(X \times 100/k) \times 0.2 < (Y-X) \times 100/k \quad (2)$$

wherein X represents yield stress [MPa] in a stress-strain curve, Y represents stress [MPa] in the stress-strain curve when the film is further stretched from the yield stress by k [%] which is an amount of strain until the yield stress, and Z represents stress [MPa] in the stress-strain curve when the film is stretched to α [%];
   wherein the retardation film has in-plane retardation Re whose unevenness in a transverse direction is 10 nm or less, and thickness direction retardation Rth whose unevenness in the transverse direction is 20 nm or less.

2. The retardation film according to claim 1, wherein in-plane retardation Re is 20 nm to 100 nm, thickness direction retardation Rth is 40 nm to 300 nm, and a ratio of Re and Rth, Rth/Re is 0.4 to 8.

3. The retardation film according to claim 2, wherein the thermoplastic resin is a cellulose acylate resin.

4. The retardation film according to claim 2, wherein the thermoplastic resin is a saturated norbornene-based resin.

5. The retardation film according to claim 1, wherein the thermoplastic resin is a cellulose acylate resin.

6. The retardation film according to claim 1, wherein the thermoplastic resin is a saturated norbornene-based resin.

7. A polarizing plate using the retardation film according to claim 1 as a substrate.

* * * * *